(12) United States Patent
Wang

(10) Patent No.: US 11,106,420 B2
(45) Date of Patent: Aug. 31, 2021

(54) METHOD, DEVICE, SYSTEM AND STORAGE MEDIUM FOR INFORMATION TRANSMISSION AND DATA PROCESSING

(71) Applicant: Alibaba Group Holding Limited, Grand Cayman (KY)

(72) Inventor: Kang Wang, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 108 days.

(21) Appl. No.: 16/436,302

(22) Filed: Jun. 10, 2019

(65) Prior Publication Data

US 2019/0377536 A1 Dec. 12, 2019

(30) Foreign Application Priority Data

Jun. 11, 2018 (CN) .......................... 201810596219.0

(51) Int. Cl.
*G06F 3/14* (2006.01)
*G06F 3/0484* (2013.01)

(52) U.S. Cl.
CPC ........ *G06F 3/1454* (2013.01); *G06F 3/04842* (2013.01); *G06F 3/04845* (2013.01); *G06F 3/04847* (2013.01)

(58) Field of Classification Search
CPC ............... G06F 3/1454; G06F 3/04842; G06F 3/04845; G06F 3/04847
See application file for complete search history.

(56) References Cited

U.S. PATENT DOCUMENTS

| | | | |
|---|---|---|---|
| 4,641,262 A | 2/1987 | Bryan et al. |
| 5,241,625 A | 8/1993 | Epard et al. |
| 5,877,762 A | 3/1999 | Young |
| 6,226,407 B1 | 5/2001 | Zabih et al. |
| 6,421,738 B1 | 7/2002 | Ratan et al. |
| 6,556,208 B1 | 4/2003 | Congdon et al. |
| 6,573,915 B1 | 6/2003 | Sivan et al. |
| 6,922,693 B1 | 7/2005 | Rubin et al. |
| 7,016,547 B1 | 3/2006 | Smirnov |
| 7,076,495 B2 | 7/2006 | Dutta et al. |

(Continued)

FOREIGN PATENT DOCUMENTS

| | | |
|---|---|---|
| CN | 101765840 B | 1/2013 |
| CN | 102771119 B | 7/2015 |

(Continued)

*Primary Examiner* — Ninos Donabed

(57) ABSTRACT

Method, device and system for information transmission and data processing. In embodiments, for target information displayed on the screen of a second terminal, when a first terminal needs the target information, the first terminal cooperates with the second terminal, and the second terminal captures the screen of the second terminal, based on the screenshot operation of the second terminal, which is combined with the information that indicates the position of the target information on the screen of the second terminal and the cross-screen transmission, the first terminal obtains the target screenshot containing the target information. Compared to taking a photo of the screen of the second terminal, the screenshot is relatively less affected by interference factors such as the screen refresh frequency, quality of the screenshot is relatively high, thus information obtained by the first terminal has relatively high clarity.

12 Claims, 12 Drawing Sheets

(56) References Cited

U.S. PATENT DOCUMENTS

| | | | |
|---|---|---|---|
| 7,197,535 | B2 | 3/2007 | Salesky et al. |
| 7,224,731 | B2 | 5/2007 | Mehrotra |
| 7,228,332 | B2 | 6/2007 | Rust |
| 7,233,336 | B2 | 6/2007 | Mondal |
| 7,260,624 | B2 | 8/2007 | Sivertsen |
| 7,933,955 | B2 | 4/2011 | Khalatian |
| 8,185,828 | B2 | 5/2012 | Liu et al. |
| 10,191,894 | B2 | 1/2019 | Nielsen et al. |
| 2006/0031779 | A1 | 2/2006 | Theurer et al. |
| 2012/0086723 | A1 | 4/2012 | Fairfield et al. |
| 2013/0076963 | A1 | 3/2013 | Sirpal et al. |
| 2014/0115454 | A1* | 4/2014 | Li .................... H04N 21/41407 715/273 |
| 2014/0240440 | A1 | 8/2014 | Seo et al. |
| 2014/0253574 | A1* | 9/2014 | Brown ................. G06T 1/0007 345/545 |
| 2016/0217114 | A1* | 7/2016 | Fan ....................... G06F 40/166 |
| 2017/0010780 | A1 | 1/2017 | Waldron, Jr. et al. |
| 2018/0196583 | A1* | 7/2018 | Astavans ........... G06K 9/00711 |
| 2018/0285053 | A1* | 10/2018 | Fang ......................... G06F 9/44 |
| 2018/0376097 | A1* | 12/2018 | Luo ................... H04N 21/4312 |

FOREIGN PATENT DOCUMENTS

| | | |
|---|---|---|
| DE | 69433189 T2 | 7/2004 |
| KR | 101957951 B1 | 3/2019 |

\* cited by examiner

METHOD, DEVICE, SYSTEM AND STORAGE MEDIUM FOR INFORMATION TRANSMISSION AND DATA PROCESSING

PRIORITY CLAIM

This patent application claims priority to China Patent Application No. 201810596219.0 filed Jun. 11, 2018 herein incorporated by reference in its entirety.

TECHNICAL FIELD

The present invention relates to communications technologies and in particular to a method, device, system and a storage medium for information transmission and data processing.

BACKGROUND

Smartphones are becoming more and more powerful and their role in mobile office scenarios is becoming increasingly important. For example, in some mobile office scenarios, it is often necessary to send some of the information displayed on the computer screen to a smartphone through another smartphone.

Current practice is typically to take a photo of a computer screen with a smartphone, and then send the captured screen photo to another smart phone through a short message or instant messaging tool. This method is convenient and simple but the quality of the photos is poor and the information clarity is low.

SUMMARY

Aspects of the present invention provide for a method, device, system and storage medium for information transmission and data processing, for transmitting information through a screenshot and improving the information clarity.

In an embodiment, the present invention provides an information transmission method comprising: a second terminal receiving a screenshot instruction and target area indication information sent by a first terminal, wherein the target area indication information indicates an area position of target information on a screen of the second terminal; performing a screenshot of the screen of the second terminal according to the screenshot instruction and the target area indication information to obtain a target screenshot, and sending the target screenshot to the first terminal, wherein the target screenshot is a local screenshot comprising the target information.

In an embodiment, the present invention further provides for an information transmission method, comprising: a first terminal sending a screenshot instruction and target area indication information to a second terminal, wherein the target area indication information is used to indicate an area position of target information on a screen of the second terminal; receiving a target screenshot sent by the second terminal, wherein the target screenshot is a local screenshot comprising the target information obtained by means of the second terminal performing a screenshot on the screen of the second terminal according to the screenshot instruction and the target area indication information.

In an embodiment, the present invention further provides for an information transmission method, comprising: a first terminal taking a photo of a screen area where target information is located on a screen of a second terminal, to obtain a local photo of the screen; sending a screenshot instruction to the second terminal to instruct the second terminal to perform a global screenshot of the screen thereof, and receiving an original screenshot returned by the second terminal; cropping the original screenshot according to the local photo of the screen to obtain a target screenshot, wherein the target screenshot is a local screenshot containing the target information.

In an embodiment, the present invention further provides for an information transmission method, comprising: a second terminal receiving a screenshot instruction sent by a first terminal; performing a global screenshot on a screen of a second terminal according to a screenshot instruction to obtain an original screenshot; sending the original screenshot to the first terminal, for the first terminal to crop a target screenshot from the original screenshot, wherein the target screenshot is a local screenshot containing the target information.

In an embodiment, the present invention further provides for an information transmission method, comprising: receiving a screenshot instruction sent by a first terminal and forwarding the screenshot instruction to a second terminal, so that the second terminal performs a global screenshot on the screen thereof to obtain an original screenshot; receiving the original screenshot sent by the second terminal and target area indication information sent by the first terminal, wherein the target area indication information indicates an area position of the target information on a screen of the second terminal; cropping the original screenshot according to the target area indication information to obtain a target screenshot, and sending the target screenshot to the first terminal, wherein the target screenshot is a local screenshot comprising the target information.

In an embodiment, the present invention further provides for an information transmission method, comprising: a second terminal receiving a screenshot instruction sent by a first terminal; performing a global screenshot on the screen of the second terminal according to the screenshot instruction to obtain an original screenshot; in response to a user's cropping operation, cropping a target screenshot from the original screenshot, and then sending the target screenshot to the first terminal.

In an embodiment, the present invention further provides for an information transmission method, comprising: a first terminal sending a screenshot instruction to a second terminal to instruct the second terminal to perform a global screenshot on the screen thereof to obtain an original screenshot; receiving the original screenshot sent by the second terminal, and then cropping a target screenshot from the original screenshot in response to a user's cropping operation.

In an embodiment, the present invention further provides for a terminal, which can be implemented as a second terminal, the terminal comprises: a memory, a processor, a screen, and a communication component;

the communication component is configured to receive a screenshot instruction and target area indication information sent by a first terminal, wherein the target area indication information indicates an area position of the target information on a screen of the second terminal; the memory is configured to store a computer program; the processor is configured to execute the computer program for:

performing a screenshot on the screen of the second terminal according to the screenshot instruction and the target area indication information to obtain a target screenshot, wherein the target screenshot is a local screenshot comprising the target information;

sending the target screenshot to the first terminal by the communication component, for the first terminal to process the target screenshot.

In an embodiment, the present invention further provides for a terminal, which can be implemented as a first terminal, the terminal comprises: a memory, a processor, and a communication component;

the memory is configured to store a computer program;

the processor is configured to execute the computer program for:

sending, by the communication component, a screenshot instruction and target area indication information to a second terminal, wherein the target area indication information is used to indicate an area position of the target information on a screen of the second terminal;

receiving, by the communication component, a target screenshot sent by the second terminal, wherein the target screenshot is a local screenshot containing the target information obtained by means of the second terminal taking a screenshot of the screen of the second terminal according to the screenshot instruction and the target area indication information.

In an embodiment, the present invention further provides for an information transmission system, the system comprises a second terminal, a first terminal, and a server; wherein the second terminal and the first terminal establish a remote communication connection through the server;

the second terminal is configured to receive a screenshot instruction and target area indication information sent by the first terminal, and perform a screenshot on the screen of the second terminal according to the screenshot instruction and the target area indication information to obtain a target screenshot, and sending the target screenshot to the first terminal;

the first terminal is configured to send the screenshot instruction and the target area indication information to the second terminal, and receive a target screenshot sent by the second terminal, wherein the target area indication information indicates an area position of the target information on a screen of the second terminal, and the target screenshot is a local screenshot comprising the target information.

In an embodiment, the present invention further provides for a terminal which can be implemented as a first terminal, the terminal comprises: a memory, a processor, and a communication component;

the memory is configured to store a computer program;

the processor is configured to execute the computer program for:

taking a photo of a screen area where the target information is located on the screen of the second terminal, and obtaining a local photo of the screen;

sending a screenshot instruction to the second terminal by the communication component, to instruct the second terminal to perform a global screenshot on the screen thereof, and receiving an original screenshot returned by the second terminal;

cropping the original screenshot according to the local photo of the screen to obtain a target screenshot, and the target screenshot is a local screenshot comprising the target information.

In an embodiment, the present invention further provides for a terminal which can be implemented as a second terminal, the terminal comprises: a memory, a processor, a screen, and a communication component;

the memory is configured to store a computer program;

the processor is configured to execute the computer program for:

receiving, by the communication component, a screenshot instruction sent by a first terminal;

performing global screenshots on the screen of the second terminal according to the screenshot instruction to obtain an original screenshot;

sending the original screenshot to the first terminal by the communication component, for the first terminal to crop a target screenshot from the original screenshot, wherein the target screenshot is a local screenshot containing target information.

In an embodiment, the present invention further provides for an information transmission system, the system comprises a second terminal, a first terminal, and a server; wherein the second terminal and the first terminal establish a remote communication connection through the server;

the second terminal is configured to receive a screenshot instruction sent by the first terminal, perform a global screenshot on the screen of the second terminal according to the screenshot instruction to obtain an original screenshot, and send the original screenshot to the first terminal;

the first terminal is configured to take a photo of a screen area of the second terminal where the target information is located to obtain a local photo of the screen; send the screenshot instruction to the second terminal, and receive the original screenshot returned by the second terminal; and cropping the original screenshot according to the local photo of the screen to obtain a target screenshot; wherein the target screenshot is a local screenshot containing the target information.

In an embodiment, the present invention further provides for a server, the server comprising: a memory, a processor, and a communication component;

the communication component is configured to receive a screenshot instruction sent by the first terminal and forward the instruction to the second terminal, so that the second terminal performs a global screenshot on the screen thereof to obtain an original screenshot; and receiving the original screenshot sent by the second terminal and target area indication information sent by the first terminal, wherein the target area indication information indicates an area position of the target information on a screen of the second terminal;

the memory is configured to store a computer program;

the processor is configured to execute the computer program for:

cropping the original screenshot according to the target area indication information to obtain a target screenshot, and the target screenshot is then sent to the first terminal by the communication component, wherein the target screenshot is a local screenshot containing the target information.

In an embodiment, the present invention further provides for an information transmission system, the system comprising a second terminal, a first terminal, and a server; wherein the second terminal and the first terminal establish a remote communication connection through the server;

the first terminal is configured to send a screenshot instruction and target area indication information to the server, and receive a target screenshot sent by the server;

the server is configured to receive the screenshot instruction and the target area indication information, forward the screenshot instruction to the second terminal, receive an original screenshot returned by the second terminal, and according to the target area instructing information to crop the original screenshot to obtain the target screenshot and forward it to the first terminal;

the second terminal is configured to receive the screenshot instruction forwarded by the server, perform a global screenshot on the screen according to the screenshot instruction to obtain the original screenshot, and return the original screenshot to the server;

wherein, the target area indication information indicates an area position of the target information on a screen of the second terminal, and the target screenshot is a local screenshot comprising the target information.

In an embodiment, the present invention further provides for a terminal which can be implemented as a second terminal, the terminal comprises: a memory, a processor, a screen, and a communication component;

the memory is configured to store a computer program;

the processor is configured to execute the computer program for:

receiving, by the communication component, a screenshot instruction sent by a first terminal;

performing a global screenshot on the screen of the second terminal according to the screenshot instruction to obtain an original screenshot;

in response to the user's cropping operation, cropping the target screenshot from the original screenshot and then sending the target screenshot to the first terminal by the communication component.

In an embodiment, the present invention further provides for an information transmission system, the system comprises a second terminal, a first terminal, and a server; wherein the second terminal and the first terminal establish a remote communication connection through the server;

the first terminal is configured to send a screenshot instruction to the second terminal, and receive a target screenshot sent by the second terminal;

the first terminal is configured to receive the screenshot instruction sent by the first terminal, perform a global screenshot on the screen of the second terminal according to the screenshot instruction to obtain an original screenshot, and respond to a user's cropping operation, cropping a target screenshot from the original screenshot, and then send the target screenshot to the first terminal.

In an embodiment, the present invention further provides for a terminal which can be implemented as a first terminal, the terminal comprises: a memory, a processor, and a communication component;

the memory is configured to store a computer program;

the processor is configured to execute the computer program for:

sending a screenshot instruction to the second terminal by the communication component to instruct the second terminal to perform a global screenshot on the screen thereof to obtain an original screenshot;

receiving, by the communication component, the original screenshot sent by the second terminal;

in response to a user's cropping operation, cropping a target screenshot from the original screenshot.

In an embodiment, the present invention further provides for an information transmission system, characterized in that the system comprises a second terminal, a first terminal, and a server; wherein the second terminal and the first terminal establish a remote communication connection through the server;

the first terminal is configured to send a screenshot instruction to the second terminal to instruct the second terminal to perform a global screenshot on the screen thereof to obtain an original screenshot; receive the original screenshot sent by the second terminal; and in response to the user's cropping operation, cropping a target screenshot from the original screenshot;

the second terminal is configured to receive the screenshot instruction sent by the first terminal, perform a global screenshot on the screen thereof according to the screenshot instruction to obtain an original screenshot, and then send the original screenshot to the first terminal.

In an embodiment, the present invention further provides for a computer readable storage medium storing a computer program, characterized in that, when the computer program is executed by a processor, the processor is caused to execute the steps performed by the second terminal as mentioned above.

In an embodiment, the present invention further provides for a computer readable storage medium storing a computer program, characterized in that, when the computer program is executed by a processor, the processor is caused to execute the steps performed by the first terminal as mentioned above.

In an embodiment, the present invention further provides for a computer readable storage medium storing a computer program, characterized in that, when the computer program is executed by a processor, the processor is caused to execute the steps performed by the server as mentioned above.

In an embodiment, the present invention further provides for a data processing method comprising:

a first computing device sending a screenshot instruction and target area indication information to a second computing device, wherein the target area indication information is used to indicate an area position on an interface, and the interface comprises a user interaction interface of the second computing device;

the first computing device receiving a target screenshot returned by the second computing device, wherein the target screenshot is a screenshot corresponding to the area position obtained by means of the second computing device performing a screenshot of the interface.

In an embodiment, the present invention further provides for a data processing method, the method comprises:

a second computing device receiving a screenshot instruction and target area indication information from a first computing device, wherein the target area indication information is used to indicate an area position on an interface, and the interface comprises a user interaction interface of the second computing device;

the second computing device performing a screenshot on the interface to obtain a target screenshot corresponding to the area position;

the second computing device sending the target screenshot to the first computing device.

In an embodiment, the present invention further provides for a data processing method, the method comprises:

a first computing device sending a screenshot instruction and target area indication information to a second computing device, wherein the target area indication information is used to indicate an area position on an interface, and the interface comprises a user interaction interface of the second computing device;

the first computing device sending sharing range information to the second computing device, wherein the second computing device sends the target screenshot to a third computing device indicated by the sharing range information, and the target screenshot is a screenshot corresponding to the area position obtained by means of the second computing device performing a screenshot of the interface.

In an embodiment, the present invention further provides for a data processing method, the method comprises:

a second computing device receiving a screenshot instruction, target area indication information and sharing range information from a first computing device, wherein the target area indication information is used to indicate an area position on an interface, and the interface comprises a user interaction interface of the second computing device;

the second computing device performing a screenshot on the interface to obtain a target screenshot corresponding to the area position;

the second computing device sending the target screenshot to a third computing device indicated by the sharing range information.

In embodiments of the present invention, for target information displayed on the screen of the second terminal, when the first terminal needs the target information, the first terminal cooperates with the second terminal, and the second terminal takes a screenshot of the screen, based on the screenshot operation of the second terminal, combining information indicating the location of the target information on the screen of the second terminal and the cross-screen transmission, the first terminal finally obtains the target screenshot containing the target information. Compared with directly taking a photo of the screen of the second terminal, the screenshot is relatively less affected by interference factors such as the screen refresh frequency, and the like; thus the quality of the screenshot is relatively high, and the information obtained by the first terminal has relatively high clarity.

In an embodiment of the present invention, the second computing device cooperates with the first computing device, and for the area position on the interface of the second computing device, the second computing device takes a screenshot of the interface. Based on the screenshot operation of the second computing device, combined with the cross-screen transmission, the second computing device can provide the target screenshot to the first computing device or a third computing device that is indicated by the sharing range information. Compared with directly taking a photo of the interface of the second computing device, the screenshot operation is relatively less affected by interference factors such as the screen refresh frequency, and the like, and the quality of the target screenshot is relatively high, and then the information sharing based on the target screenshot is beneficial to improve the clarity of the information.

BRIEF DESCRIPTION OF DRAWINGS

The drawings described herein provided for further understanding of the present invention and constitute a part of the present application. The exemplary embodiments of the present invention and the descriptions thereof are used to explain the present invention and do not constitute an improper limitation on the present invention. In the drawings.

DETAILED DESCRIPTION

Embodiments

In order to make the objects, technical solutions and advantages of the present invention clearer, the technical solutions are clearly and completely described in the following with reference to embodiments and corresponding drawings. It will be apparent to one skilled in the art that the described embodiments are only descriptions of some embodiments and not of all embodiments. All other equivalent embodiments herein described are within the scope of the present claims.

In the prior art, when a mobile phone needs the information displayed on a computer screen, the computer screen is directly photographed, but the photo quality is poor and the information clarity is not high, either. For the technical problems mentioned, in some embodiments of the present invention, for the target information displayed on the screen of a second terminal, when the first terminal needs the target information, the first terminal cooperates with the second terminal, and the second terminal takes a screenshot based on a screenshot operation of the second terminal, combined with information indicating the location of the target information on the screen of the second terminal and the cross-screen transmission, the first terminal finally obtains a target screenshot containing the target information. Compared with directly taking a photo of the screen of the second terminal, the screenshot of the present invention is relatively less affectable by interference factors such as the screen refresh frequency, and the like, the quality of the screenshot is relatively high, and the information obtained by the first terminal in this way is relatively high in clarity.

Figure 1A:
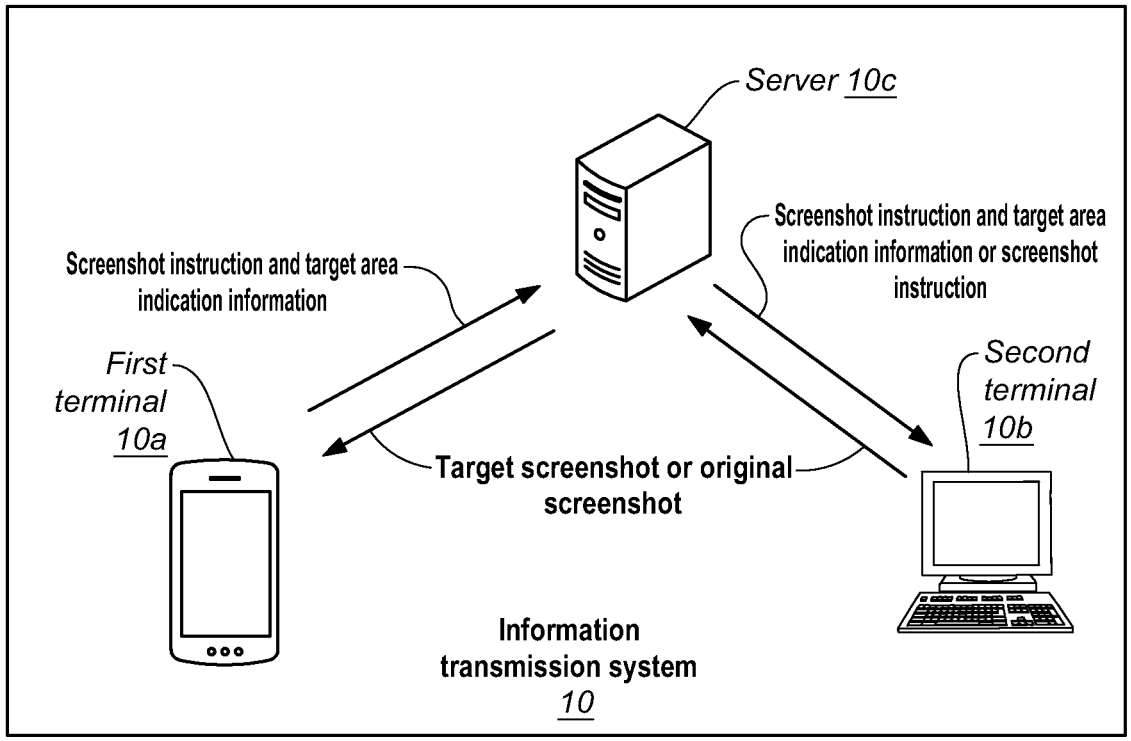
FIG. 1a is a schematic structural view of an information transmission system according to an exemplary embodiment of the present invention.
Figure 1B:
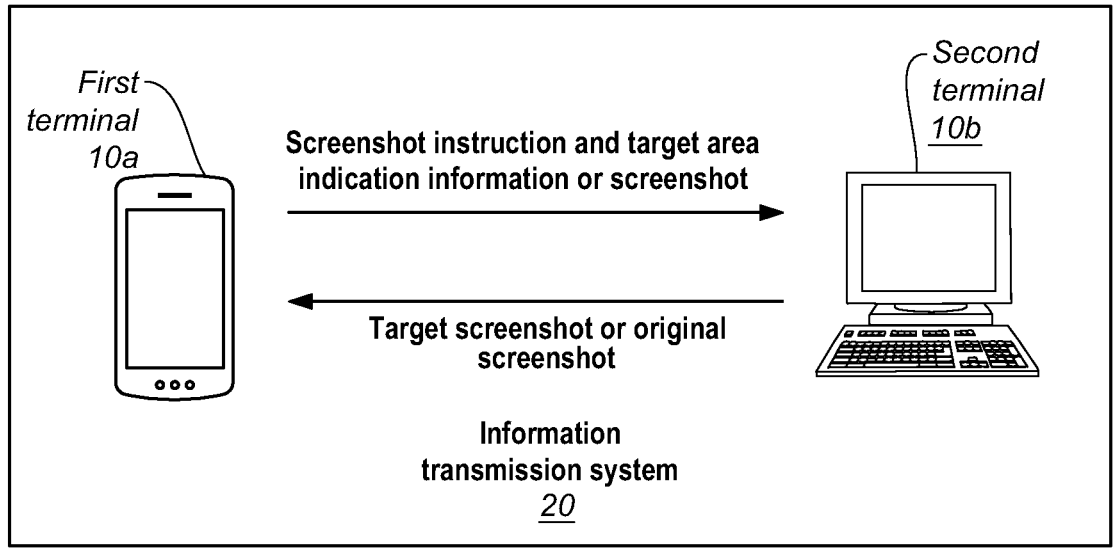
FIG. 1b is a schematic structural view of another information transmission system according to an exemplary embodiment of the present invention.

In exemplary embodiments of the present invention, two types of information transmission systems are provided, namely the information transmission system 10 as shown in FIG. 1a and the information transmission system 20 as shown in FIG. 1b. As shown in FIG. 1a, the information transmission system 10 includes a first terminal 10a, a second terminal 10b, and a server 10c. The information transmission system 10 is not limited by the network environment, and can be applied to a local area network environment, and can also be applied to an Internet environment such as a wide area network or a metropolitan area network, and the like. Compared with the information transmission system 10 shown in FIG. 1a, the information transmission system 20 shown in FIG. 1b includes a first terminal 10a and a second terminal 10b, excluding the server 10c. The information transmission system 20 is mainly used in a local area network environment.

In the information transmission system 10 or 20, the first terminal 10a refers to a computer device that is used by a user and has functions such as calculation, Internet access, communication, and the like required by the user. Optionally, the first terminal 10a may be a computer device suitable for a mobile office scenario, such as a smart phone, a tablet, a wearable device, and the like. The first terminal 10a typically includes at least one processing unit and at least one memory. The numbers of processing units and memories depend on the configuration and type of the first terminal 10a. The memory may include volatile memories, such as RAM, and may also include non-volatile memories, such as Read-Only Memory (ROM), flash memory, etc., or both. An operating system (OS), one or more applications, and program data are stored in the memory. In addition to the processing unit and the memory, the first terminal 10a may also include a basic configuration including a network card chip, an 10 bus, an audio and video component, and the like. Optionally, according to the implementation form of the first terminal 10a, the first terminal 10a may also include some peripheral devices, such as a keyboard, a mouse, a stylus, a printer, and the like. These peripheral devices are well known in the art and will not be described herein again.

In the information transmission system 10 or 20, the second terminal 10b refers to a computer device that is used by a user and has functions such as calculation, Internet access, communication, and the like required by the user. Optionally, the second terminal 10b may be a computer device suitable for a mobile office scenario, such as a smart phone, a tablet computer, a personal computer, a wearable device, and the like. Similar to the first terminal 10a, the second terminal 10b typically also includes at least one processing unit and at least one memory. The number of processing units and memories depends on the configuration and type of the second terminal 10b. The memory may include volatile memories, such as RAM, and may also include non-volatile memories, such as ROM, flash memory, etc., or both. The OS usually stores an OS, one or more applications, and may store program data and the like. In addition to the processing unit and the memory, the second terminal 10b also includes a basic configuration of a network card chip, an 10 bus, an audio and video component, and the like. Optionally, according to the implementation form of the second terminal 10b, the second terminal 10b may also include some peripheral devices, such as a keyboard, a mouse, a stylus, a printer, and the like. These peripheral devices are well known in the art and will not be described again herein.

It should be noted that the first terminal 10a and the second terminal 10b may be different types of devices, or may be the same type of devices. For example, the first terminal 10a is a smartphone, and the second terminal 10b is a personal computer. In another example, the first terminal 10a and the second terminal 10b are both smartphones.

In the information transmission system 10, the server 10c is mainly responsible for establishing a remote communication connection between the first terminal 10a and the second terminal 10b. The server 10c may be a server device such as a conventional server, a cloud server, a cloud host, a virtual center, and the like. The structure of the server device mainly includes a processor, a hard disk, a memory, a system bus, and the like, and is similar to the architecture of a general computer.

In the information transmission system 10, the first terminal 10a and the second terminal 10b establish a remote communication connection therebetween through the server 10c. The first terminal 10a and the second terminal 10b can establish a communication connection with the server 10c, respectively, and the server 10c establishes a binding relationship between the first terminal 10a and the second terminal 10b. Based on the binding relationship, the server 10c can perform information forwarding between the first terminal 10a and the second terminal 10b to achieve the purpose of remote communication between the first terminal 10a and the second terminal 10b.

Optionally, the first terminal 10a and the second terminal 10b may be connected to the server 10c via a wireless or wired connection. In one embodiment, if the first terminal 10a or the second terminal 10b is in communication connection with the server 10c through a mobile network, the network standard of the mobile network may be any of 2G (GSM), 2.5G (GPRS), 3G (WCDMA, TD-SCDMA, CDMA2000, UTMS), 4G (LTE), 4G+(LTE+), WiMAX, and the like. In addition, the first terminal 10a or the second terminal 10b may also establish a communication connection with the server 10c through a communication method such as Wi-Fi, Bluetooth, infrared, and the like.

Optionally, the server 10c may establish a binding relationship between the first terminal 10a and the second terminal 10b according to the sharing information between the first terminal 10a and the second terminal 10b. For example, the first terminal 10a and the second terminal 10b may use the same registered account to log in to the server 10c to respectively establish a communication connection with the server 10c, and the server 10c can establish a binding relationship between the first terminal 10a and the second terminal 10b according to the same registered account; that is, the remote communication can be performed between different terminals using the same registered account. In another example, the first terminal 10a and the second terminal 10b may log in to the server 10c using different registered accounts, respectively establish a communication connection with the server 10c, and the two registered accounts are bound with the same e-mail address, the same mobile phone number or the same ID number. The server 10c thus can establish a binding relationship between the first terminal 10a and the second terminal 10b according to information such as the same email address, the same mobile phone number, or the same ID card number that the two registered accounts are bound to. That is, the remote communication can be performed between different terminals bound to the same e-mail address, the same mobile phone number, or the same ID number.

In the information transmission system 20, a communication connection is established between the first terminal 10a and the second terminal 10b. The first terminal 10a and the second terminal 10b may be connected in a wireless or wired manner. Optionally, the first terminal 10a may establish a communication connection with the second terminal 10b by using a communication manner such as Wi-Fi, Bluetooth, infrared, and the like.

The information transmission system 10 or 20 of the present invention can be applied to a mobile office scenario, but is not limited to a mobile office scenario. The information transmission system provided by the embodiments of the present invention can be used in an application scenario in which a terminal needs to display related information on the screen of another terminal.

In the information transmission system 10 or 20, information is displayed on the screen of the second terminal 10b, and the information may include a desktop icon, a notification message, text, a picture, audio, a video, and/or a link. The first terminal 10a needs to use a part of the information displayed on the screen of the second terminal 10b. For example, the first terminal 10a may need to forward part of the information displayed on the screen of the second terminal 10b to other users or other terminals. In another example, the first terminal 10a may need to save part of the information displayed on the screen of the second terminal 10b as a backup. For the convenience of description and differentiation, the part of the information displayed on the screen of the second terminal 10b required by the first terminal 10a is referred to as the target information. The embodiments do not limit the type of target information, and may include, for example, text, pictures, audio, video, and/or links.

In the information transmission system 10, the first terminal 10a, the second terminal 10b, and the server 10c cooperate with each other, and the second terminal 10b can take a screenshot of the screen thereof, based on the screenshot operation of the second terminal 10b, and combined with the area position of the target information on the screen of the second terminal 10b and the cross-screen transmission, the first terminal 10a is able to finally obtain a partial screenshot containing the target information.

Correspondingly, in the information transmission system 20, the first terminal 10a and the second terminal 10b cooperate with each other, and the second terminal 10b can take a screenshot of the screen thereof, based on the screenshot operation of the second terminal 10b, and combined with the area position of the target information on the screen of the second terminal 10b and the cross-screen transmission the first terminal 10a is able to finally obtain a partial screenshot containing the target information. For the convenience of description and differentiation, the partial screenshot containing the target information is referred to as a target screenshot.

In the embodiments of the present invention, based on the screenshot operation of the second terminal 10b, combined with the information indicating the area position of the target information on the screen of the second terminal 10b and the cross-screen transmission, the first terminal 10a can obtain the target screenshot. When compared with directly taking a photo of the screen of the second terminal 10b, the screenshot is relatively less affected by the interference factors such as the screen refresh frequency, and the like, the quality of the screenshot is relatively high, and the clarity of the information obtained by the first terminal 10a is relatively high.

It is noted that, based on the screenshot operation of the second terminal 10b, combined with the information indicating the area position of the target information on the screen of the second terminal and the cross-screen transmission, there are many ways in which the first terminal 10a can obtain the target screenshot. Several exemplary embodiments are described below:

Exemplary Embodiment A

The second terminal performs a screenshot based on the screenshot instruction and the target area indication information to obtain a target screenshot, and sends the target screenshot to the first terminal.

Exemplary Embodiment B

The second terminal performs a global screenshot on the screen to obtain an original screenshot and send it back to the first terminal, and then the first terminal crops a target screenshot from the original screenshot according to the target area indication information.

Exemplary Embodiment C

The server crops a target screenshot from the original screenshot obtained by the second terminal from the global screenshot of the screen according to the target area indication information provided by the first terminal, and then send the target screenshot to the first terminal.

Exemplary Embodiment D

The second terminal performs a global screenshot on the screen according to the screenshot instruction to obtain an original screenshot, and crops the target screenshot from the original screenshot, and then sends the target screenshot to the first terminal in response to the user's cropping operation.

Exemplary Embodiment E

The second terminal performs a global screenshot on the screen according to the screenshot instruction to obtain an original screenshot and send it to the first terminal; and then the first terminal crops a target screenshot from the original screenshot in response to the user's cropping operation.

It is noted that the above exemplary embodiments A to E can be implemented based on the information transmission system 10 shown in FIG. 1a. Of course, in addition to the exemplary embodiment C, the above exemplary embodiments A, B, D, and E may also be implemented based on the information transmission system 20 illustrated in FIG. 1b.

The above exemplary embodiments A, B, D, and E may be implemented based on the information transmission system 10 illustrated in FIG. 1a, or may be implemented based on the information transmission system 20 illustrated in FIG. 1b. When implemented based on different information transmission systems, the main difference would be that the information transmission manner between the first terminal 10a and the second terminal 10b may be different.

For example, in the information transmission system 10 shown in FIG. 1a, the related information between the first terminal 10a and the second terminal 10b, such as a screenshot instruction, target area indication information, an original screenshot, and the like, can be forwarded by the server 10c; in the information transmission system 20 shown in FIG. 1b, the related information between the first terminal 10a and the second terminal 10b, such as a screenshot instruction, target area indication information, an original screenshot, and the like, can be forwarded without the server 10c.

For the purpose of simplifying the description, and also for being applicable for both the information transmission systems shown in FIGS. 1a and 1b, in the examples provided below for describing the exemplary embodiments A, B, D and E, when referring to the communication between the first terminal and the second terminal, the following expressions are used "the first terminal sends to the second terminal . . . ," "the second terminal receives from the first terminal . . . ," "the second terminal sends to the first terminal . . . ," "the first terminal receives from the second terminal . . . ," and the like, however, it will be understood by a person skilled in the art that, unless otherwise specified, when the respective expressions are applied to the information transmission system 10 as shown in FIG. 1a, the above descriptions are actually equivalent to "the first terminal sends to the second terminal through the server . . . ," "the second terminal receives from the first terminal through the server . . . ," "the second terminal sends to the first terminal through the server . . . ," "the first terminal receives from the second terminal through the server . . . "; accordingly, when the respective expressions are applied to the information transmission system 20 as shown in FIG. 1b, no forward by the server is needed in the corresponding descriptions.

The exemplary embodiments A to E will be described respectively below in detail.

Exemplary Embodiment A

First, the exemplary embodiment A will be described from the perspective of the first terminal and the second terminal, respectively.

Figure 2A:
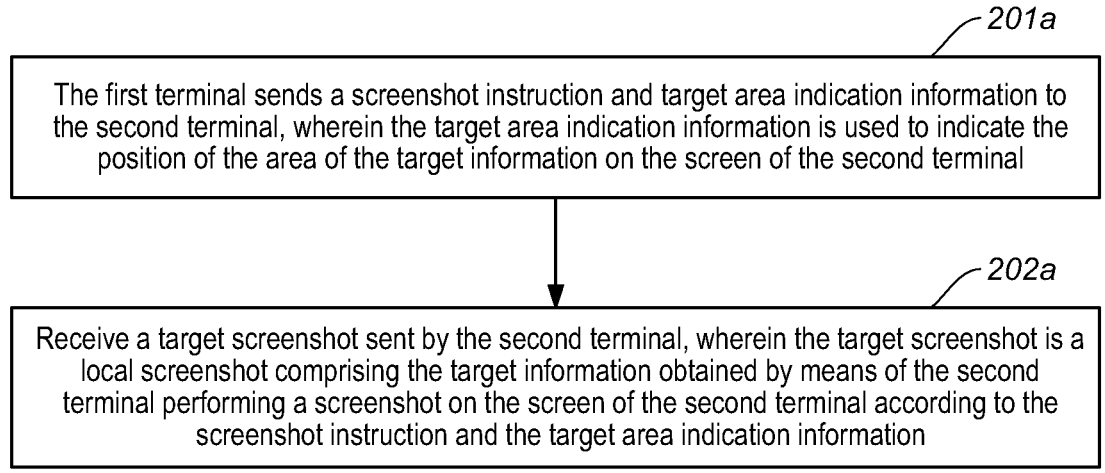
FIG. 2a is a schematic flowchart of an information transmission method described from the point of view of a first terminal according to an exemplary embodiment of the present invention.

As shown in FIG. 2a, from the perspective of the first terminal, the process of the method of the exemplary embodiment A includes the following steps:

201a. The first terminal sends a screenshot instruction and target area indication information to the second terminal, wherein the target area indication information is used to indicate the position of the area of the target information on the screen of the second terminal.

202a. Receive a target screenshot sent by the second terminal, wherein the target screenshot is a local screenshot comprising the target information obtained by means of the second terminal performing a screenshot on the screen of the second terminal according to the screenshot instruction and the target area indication information.

Figure 2B:
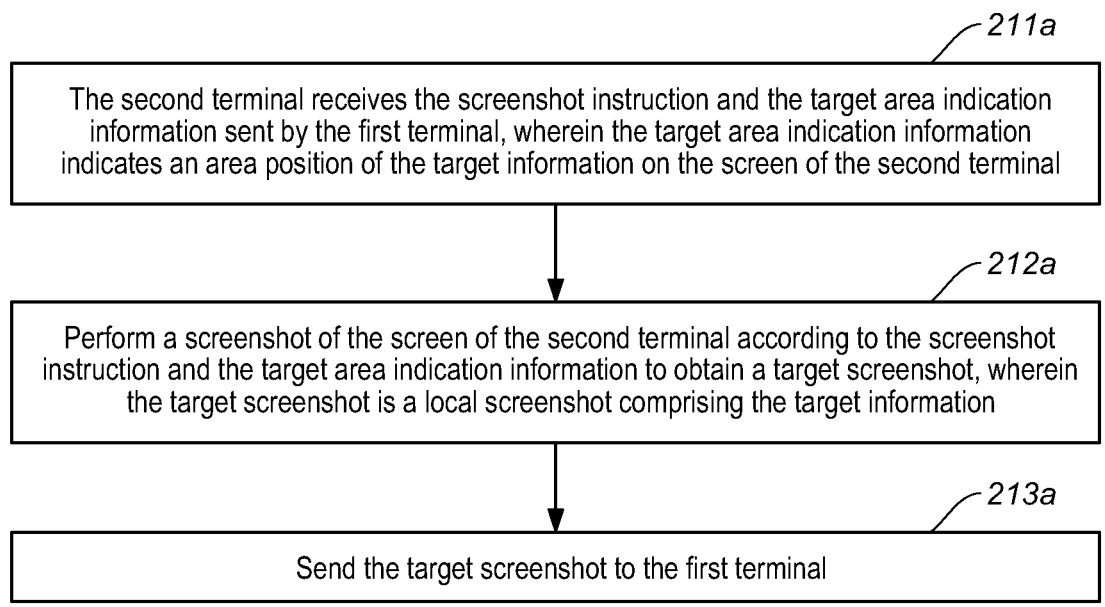
FIG. 2b is a schematic flowchart of an information transmission method described from the point of view of a second terminal according to an exemplary embodiment of the present invention.

As shown in FIG. 2b, from the perspective of the second terminal, the process of the method of the exemplary embodiment A includes the following steps:

211a. The second terminal receives the screenshot instruction and the target area indication information sent by the first terminal, wherein the target area indication information indicates an area position of the target information on the screen of the second terminal.

212a. Perform a screenshot of the screen of the second terminal according to the screenshot instruction and the target area indication information to obtain a target screenshot, wherein the target screenshot is a local screenshot comprising the target information.

213a. Send the target screenshot to the first terminal.

In the exemplary embodiment A, information is displayed on the screen of the second terminal, and the information may include text, pictures, audio, video, and/or links, and the like. The first terminal needs to use part of the information displayed on the screen of the second terminal, which is simply referred to as the target information. When the first terminal needs to use the target information displayed on the screen of the second terminal, on the one hand, a screenshot instruction may be sent to the second terminal to instruct the second terminal to take a screenshot of the screen; on the other hand, the target area indication information may be acquired, and the target area indication information is then sent to the second terminal, so that the second terminal can determine the location of the area of the target information on the screen according to the target area indication information. The target area indication information is used to indicate an area position of the target information on the screen of the second terminal, and may be in any information form capable of indicating the location information of the target information on the screen of the second terminal.

It should be noted that the sequence of the screenshot instruction and the target area indication information to be sent by the first terminal to the second terminal is not limited. For example, the screenshot instruction may be sent first, and then the target area indication information is sent next. Alternatively, the target area indication information may be sent first, and then the screenshot instruction is sent; or the screenshot instruction and the target area indication information may also be sent at the same time in parallel.

For the second terminal, the screenshot instruction and the target area indication information sent by the first terminal can be received by the second terminal, so the second terminal next performs screenshot on its screen according to the screenshot instruction and the target area indication information to obtain a target screenshot, and then the target screenshot is sent to the first terminal. The first terminal receives the target screenshot sent by the second terminal, and the target screenshot includes the required target information. After receiving the target screenshot sent by the second terminal, the first terminal may further process the required target information based on the target screenshot, for example, forwarding the target screenshot to another user or another terminal, or saving the target screenshot, or according to the target information contained in the target screenshot to perform business operations such as making a payment, controlling a risk, and the like.

For the second terminal, after receiving the screenshot instruction and the target area indication information, one of the following two alternative implementation manners may be used to obtain the target screenshot:

In the optional embodiment 1, the second terminal first determines, according to the target area indication information, a screen area where the target information of the second terminal is located, and then performs a screenshot on the screen area where the target information is located on the screen of the second terminal according to the screenshot instruction, so as to obtain a target screenshot.

In the optional embodiment 2, the second terminal first performs a global screenshot on the screen of the second terminal according to the screenshot instruction to obtain an original screenshot, and then crops the original screenshot according to the target area indication information to obtain a target screenshot.

In the latter manner, the global screenshot refers to the screenshot of the entire screen, the screenshot range can be the default entire screen, or can be preset by the user. For example, the user can set the screen area with information displayed as the screenshot range of the global screenshot. In another example, the user may set a separation distance corresponding to each screen boundary to facilitate global screenshot of the screen according to the set separation distance. The separation distance herein refers to the distance between the start position of the screenshot and a boundary of the screen.

The original screenshot obtained in a global screenshot mode may include all or most of the information displayed on the entire screen, or the information displayed in the core area of the screen, which can satisfy most of the requirements. The core area of the screen generally refers to the middle area of the screen. Of course, the core area of the screen can be flexibly set according to the screen display style or pattern. For example, the core area of the screen can be defined as the left half of the screen, or the upper right corner, and so on.

The target area indication information used to indicate the location of the area of the target information on the second terminal screen may have multiple implementation forms. The exemplary embodiment A will be further described below in conjunction with several types of target area indication information.

In an optional implementation a1, the first terminal may take a photo of a screen area where the target information is located on the second terminal, and obtain a local photo of the screen, wherein the local photo of the screen can indicate the area position of the target information on the screen of the second terminal. In this optional implementation, the first terminal may send a local photo of the screen to the second terminal, wherein the local photo of the screen carries the target area indication information. For the second terminal, a local photo of the screen sent by the first terminal is received, and then a target screenshot may be obtained by the method of the foregoing optional embodiment 1 or optional embodiment 2.

For example, in the optional embodiment 1, the second terminal may determine, according to the received local photo of the screen, a screen area where the target information is located on the second terminal, and then, a screenshot can be performed with the screen area of the target information on the screen of the second terminal to obtain a target screenshot. In the optional embodiment 2, the second terminal may first perform a global screenshot on the screen of the second terminal according to the screenshot instruction to obtain an original screenshot, and then crop the original screenshot based on the received local photo of the screen to obtain a target screenshot.

Figure 2C:
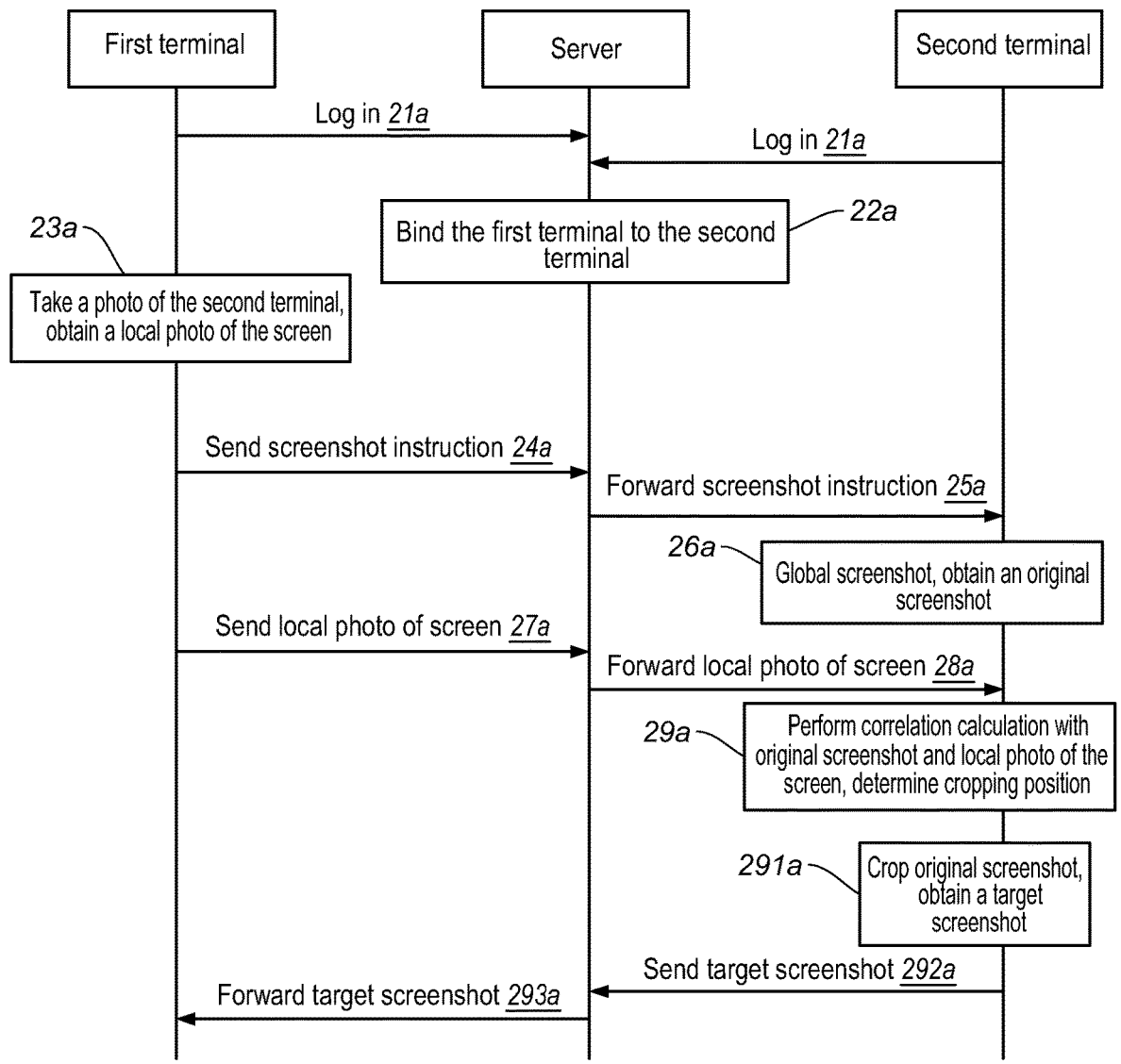
FIG. 2c is a schematic flowchart of an information transmission method described in an interactive manner according to an exemplary embodiment of the present invention.

In conjunction with the system architecture as shown in FIG. 1a, an information transmission method as shown in FIG. 2c includes the following steps:

21a. The first terminal and the second terminal log in to the server with the same registered account.

22a. The server binds the first terminal to the second terminal to establish a remote communication connection between the first terminal and the second terminal.

23a. The first terminal takes a photo on a screen area where the target information is located on the screen of the second terminal, and then obtains a local photo of the screen.

Optionally, the first terminal may activate a built-in camera of the first terminal to take a photo of the screen area where the target information is located on the screen of the second terminal. Alternatively, the first terminal may activate a third party camera to take a photo of the screen area where the target information is located on the screen of the second terminal.

24a. The first terminal sends a screenshot instruction to the server.

25a. The server forwards the screenshot instruction to the second terminal.

26a. The second terminal performs a global screenshot of the screen thereof according to the screenshot instruction to obtain an original screenshot.

27a. The first terminal sends a local photo of the screen to the server.

28a. The server forwards the local photo of the screen to the second terminal.

290a. The second terminal performs a correlation calculation on the local photo of the screen and the original screenshot, and determines a cropping position for the original screenshot, in which the cropping position defines a boundary of the area on the screen of the second terminal that is photographed.

Optionally, the second terminal may perform an Auto Correlation calculation on the local photo of the screen and the original screenshot.

291a. The second terminal crops the original screenshot according to the cropping position of the original screenshot to obtain a target screenshot.

292a. The second terminal sends the target screenshot to the server.

293a. The server forwards the target screenshot to the first terminal.

In the above example, the first terminal captures a photo of the screen area where the target information is located on the screen of the second terminal and then sends the photo to the second terminal, and the second terminal automatically recognizes the cropping position of the original screenshot based on the photo received, and then according to the cropping position, crops to obtain the target screenshot, which is then sent back to the first terminal. This process has the advantages of convenient operation, safety, and high efficiency.

Figure 2D:
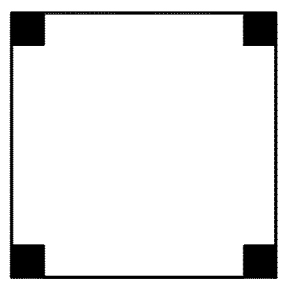
FIG. 2d is a schematic view of a dot pattern displayed on a screen of a second terminal according to an exemplary embodiment of the present invention.

In the optional embodiment a2, a dot pattern may be displayed on the screen of the second terminal, the dot pattern covers the entire screen of the second terminal, and the dot pattern has a position attribute. The position attribute of the dot pattern may reflect the position of the dot pattern on the screen of the second terminal, and the position attribute of the dot pattern may be the position coordinates, color, texture, and the like of each block in the dot pattern. As shown in FIG. 2d, a schematic view of a dot pattern is shown.

In the optional embodiment a2, the first terminal may take a photo of the screen area where the target information is located on the screen of the second terminal to obtain a local photo of the screen. The local photo of the screen includes a local dot pattern which is a partial dot pattern displayed on the screen area where the target information is located, such as a dot pattern in the dotted frame in FIG. 2d, wherein, the location attribute of the local dot pattern included in the local photo of the screen may indicate the location of the area of the target information on the screen of the second terminal.

Based on the above-described local photo of the screen including the local dot pattern, in the optional embodiment a2-1, the first terminal may send a local photo of the screen including the local dot pattern to the second terminal. For the second terminal, it receives the local photo of the screen sent by the first terminal, and then the target screenshot may be further obtained in reference to the foregoing optional embodiment 1 and optional embodiment 2.

For example, in the optional embodiment 2, the second terminal may first perform a global screenshot of the screen of the second terminal according to the screenshot instruction to obtain an original screenshot, and then according to the position attribute of the local dot pattern included in the local photo of the screen and the position attribute of the dot pattern included in the original screenshot, the cropping position of the original screenshot is determined, the original screenshot is then cropped according to the determined cropping position to obtain the target screenshot.

Optionally, the second terminal may compare the position attribute of the local dot pattern included in the local photo of the screen with the position attribute of the dot pattern included in the original screenshot to determine a partial area of the original screenshot including the local dot pattern, and then the cropping position of the original screenshot can be determined according to the boundary of the partial area.

Based on the above local photo of the screen including the local dot pattern, in an alternative embodiment a2-2, the first terminal identifies the position attribute of the local dot pattern contained in the local photo of the screen, and then uses the identified position attribute of the dot pattern as the target area indication information to be sent to the second terminal. For the second terminal, it receives the position attribute of the local dot pattern sent by the first terminal, and then the target screenshot may be obtained according to the method of the foregoing optional embodiment 1 and optional embodiment 2. The position attribute of the local dot pattern may be the position coordinates of each block in the local dot pattern, the color feature of each block in the local dot pattern, or the texture feature of each block in the local dot pattern.

For example, in optional embodiment 1, the second terminal may determine, according to the position attribute of the received local dot pattern, a screen area where the target information is located on the screen of the second terminal, and then perform a screenshot on the area position of the target information on the screen of the second terminal according to the screenshot instruction to obtain a target screenshot. In the optional embodiment 2, the second terminal may first perform a global screenshot on the screen of the second terminal according to the screenshot instruction to obtain an original screenshot, and then according to the received position attribute of the local dot pattern and the position attribute of the dot pattern included in the original screenshot, determine the cropping position of the original screenshot; the original screenshot is thus cropped according to the determined crop position to obtain the target screenshot.

Figure 2E:
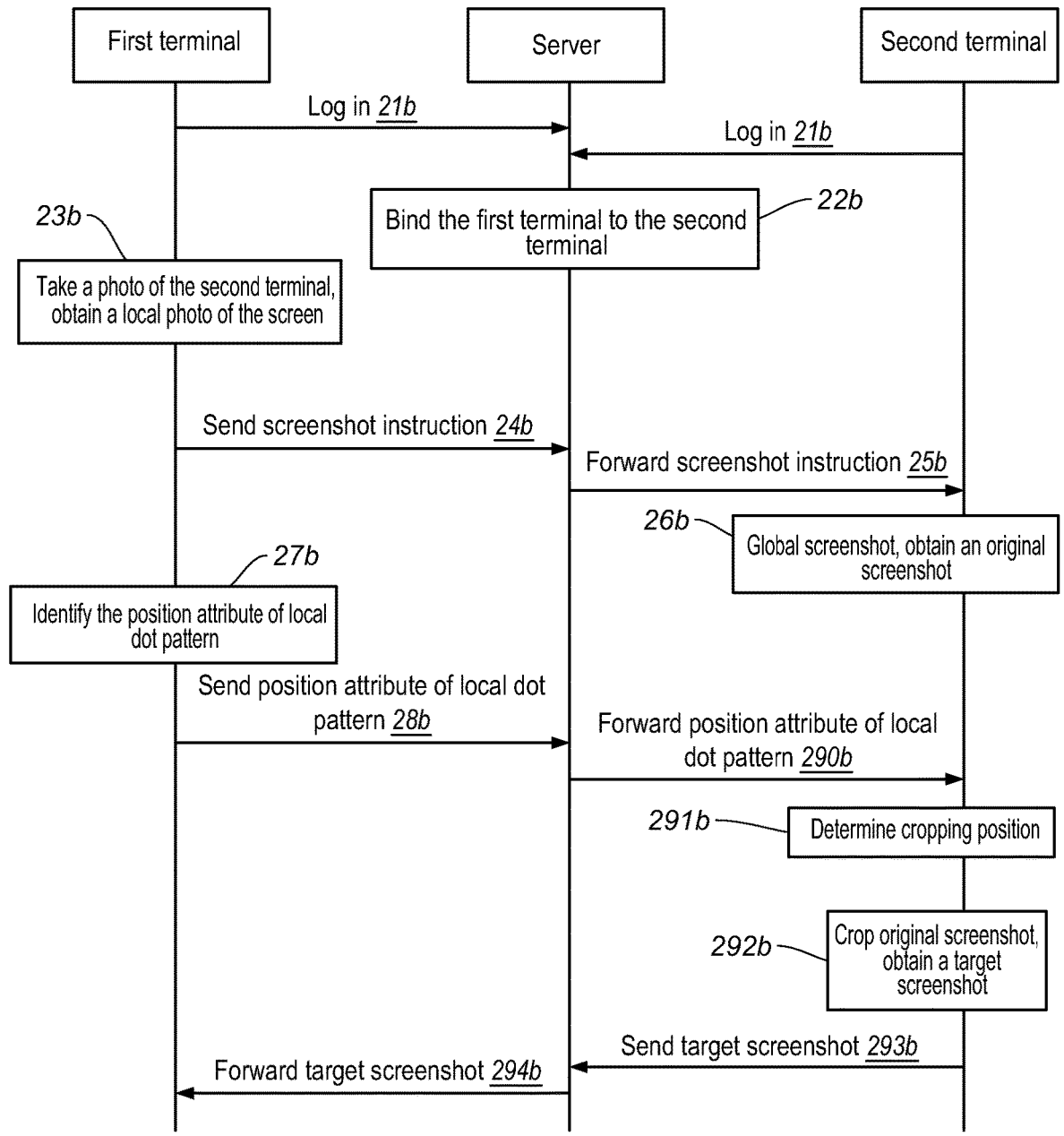
FIG. 2e is a schematic flowchart of another information transmission method described in an interactive manner according to an exemplary embodiment of the present invention.

In reference to the system architecture shown in FIG. 1a, an information transmission method as shown in FIG. 2e includes the following steps:

21b. The first terminal and the second terminal use the same registered account to log in to the server.

22b. The server binds the first terminal to the second terminal to establish a remote communication connection between the first terminal and the second terminal.

23b. The first terminal takes a photo of the screen area where the target information is located on the screen of the second terminal, and obtains a local photo of the screen, and the screen of the second terminal displays a dot pattern, wherein the local photo of the screen includes a local dot pattern displayed in the screen area where the target information is located.

Optionally, the first terminal may activate a built-in camera of the first terminal to take a photo of the screen area where the target information is located on the screen of the second terminal. Alternatively, the first terminal may activate a third-party camera to take a photo of the screen area where the target information is located on the screen of the second terminal.

24b. The first terminal sends a screenshot instruction to the server.

25b. The server forwards the screenshot instruction to the second terminal.

26b. The second terminal performs a global screenshot of the screen thereof according to the screenshot instruction to obtain an original screenshot.

27b. The first terminal identifies a position attribute of the local dot pattern in the local photo of the screen.

28b. The first terminal sends the position attribute of the local dot pattern to the server.

290b. The server forwards the position attribute of the local dot pattern to the second terminal.

291b. The second terminal determines a cropping position of the original screenshot according to the received position attribute of local dot pattern and the position attribute of the dot pattern included in the original screenshot, in which, the cropping position defines a boundary of the area of the photo on the screen of the second terminal.

Optionally, the second terminal may perform auto-correlation calculation with the local photo of the screen and the original screenshot.

292b. The second terminal crops the original screenshot according to the cropping position of the original screenshot to obtain a target screenshot.

293b. The second terminal sends the target screenshot to the server.

294b. The server forwards the target screenshot to the first terminal.

In the above embodiment, a dot pattern assist is displayed on the screen of the second terminal. The first terminal captures a photo of a screen area where the target information is located on the screen of the second terminal, and sends the photo to the second terminal. The second terminal automatically identifies the cropping position of the original screenshot according to the position attribute of the local dot pattern included in the photo. The target screenshot is cropped based on the cropping position, and then is sent back to the first terminal. This process has the advantages of convenient operation, safety, and high efficiency.

Exemplary Embodiment B

First, the exemplary embodiment B will be described from the perspective of the first terminal and the second terminal, respectively.

Figure 3A:
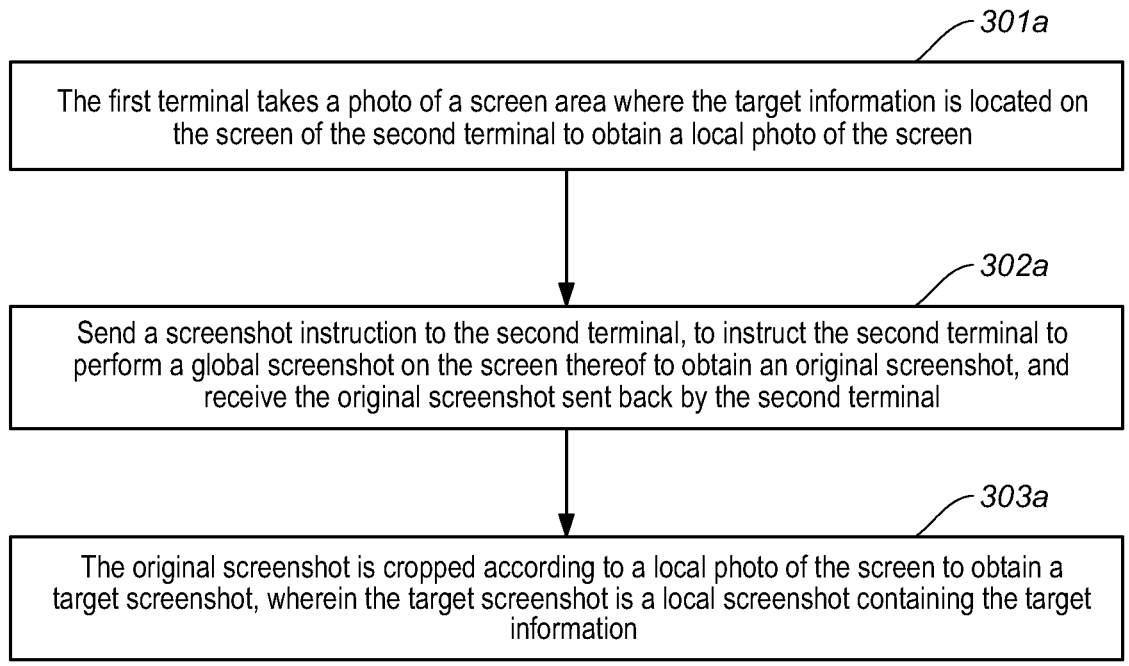
FIG. 3a is a schematic flowchart of an information transmission method described from the point of view of a first terminal according to another exemplary embodiment of the present invention.

As shown in FIG. 3a, from the perspective of the first terminal, the process of the method of the exemplary embodiment B includes the following steps:

301a. The first terminal takes a photo of a screen area where the target information is located on the screen of the second terminal to obtain a local photo of the screen.

302a. Send a screenshot instruction to the second terminal, to instruct the second terminal to perform a global screenshot on the screen thereof to obtain an original screenshot, and receive the original screenshot sent back by the second terminal.

303a. The original screenshot is cropped according to a local photo of the screen to obtain a target screenshot, wherein the target screenshot is a local screenshot containing the target information.

Figure 3B:
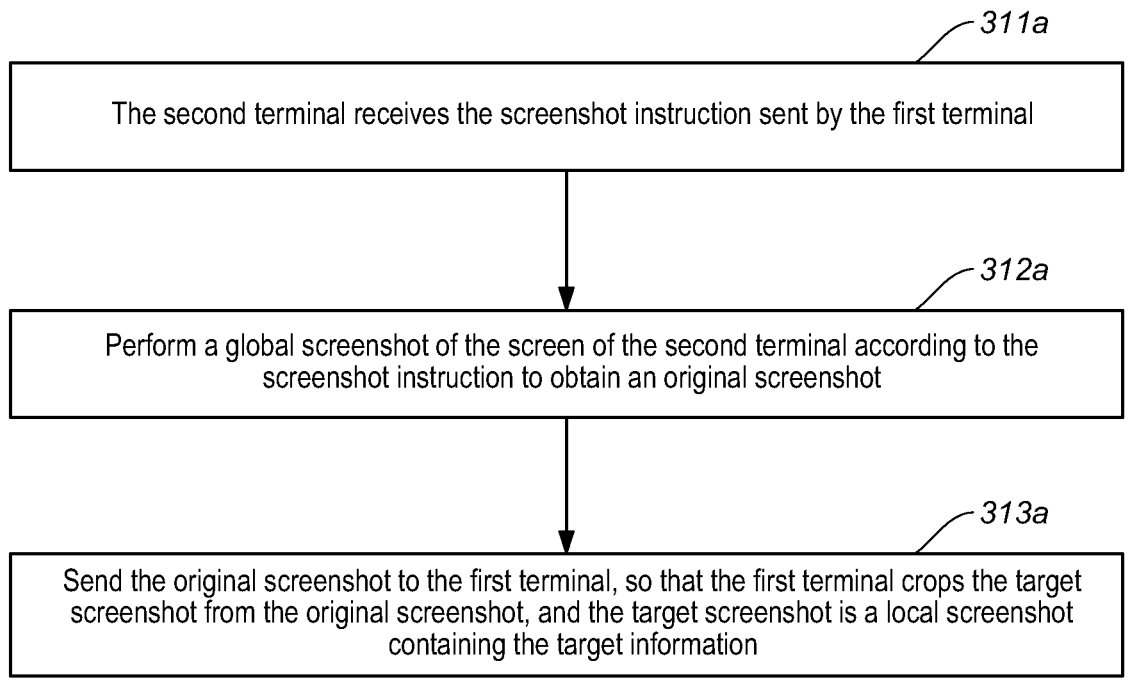
FIG. 3b is a schematic flowchart of an information transmission method described from the point of view of a second terminal according to another exemplary embodiment of the present invention.

As shown in FIG. 3b, from the perspective of the second terminal, the process of the method of the exemplary embodiment B includes the following steps:

311a. The second terminal receives the screenshot instruction sent by the first terminal.

312a. Perform a global screenshot of the screen of the second terminal according to the screenshot instruction to obtain an original screenshot.

313a. Send the original screenshot to the first terminal, so that the first terminal crops the target screenshot from the original screenshot, and the target screenshot is a local screenshot containing the target information.

In exemplary embodiment B, information is displayed on the screen of the second terminal, and such information may include text, pictures, audio, video, and/or links, and the like. The first terminal needs to use part of the information displayed on the screen of the second terminal, which is simply referred to as target information. In the case where the first terminal needs to use the target information displayed on the screen of the second terminal, on one hand, a screenshot instruction may be sent to the second terminal to instruct the second terminal to take a screenshot of the screen; on the other hand, the screen area where the target information is located on the screen of the second terminal is photographed to obtain a local photo of the screen, and the local photo of the screen may indicate the position of the area of the target information on the screen of the second terminal.

It should be noted that the sequence of the first terminal sending a screenshot instruction to the second terminal and taking a photo of the screen area where the target information is located on the screen of the second terminal is not limited herein. For example, the screenshot instruction may be sent first, and then take a photo, or take a photo first and then send a screenshot instruction.

For the second terminal, it receives the screenshot instruction sent by the first terminal, and performs a global screenshot according to the screenshot instruction to obtain an original screenshot, and then the original screenshot is sent to the first terminal. The first terminal receives the original screenshot sent by the second terminal, and crops the original screenshot according to the local photo of the screen to obtain a target screenshot, wherein the target screenshot is a local screenshot containing the target information. After the first terminal crops the target screenshot, the first terminal can further process the required target information according to the target screenshot. For example, the target screenshot is forwarded to another user or another terminal, or the target screenshot is saved, or some business operations are performed according to the target information contained in the target screenshot, such as making a payment, controlling a risk, and the like.

In optional embodiment b1, the first terminal may crop the original screenshot as follows: local photo of the screen is compared with the original screenshot to determine the cropping position of the original screenshot; the original screenshot is then cropped according to the cropping position of the original screenshot to obtain a target screenshot.

In optional embodiment b2, a dot pattern may be displayed on the screen of the second terminal, the dot pattern covering the entire screen of the second terminal, and the dot pattern has a position attribute. The position attribute of the dot pattern can reflect the position of the dot pattern on the screen of the second terminal, and the position attribute of the dot pattern may be the position coordinates, color, texture, and the like of each block in the dot pattern. As shown in FIG. 2d, a schematic view of a dot pattern is shown.

In optional embodiment b2, the first terminal may take a photo of a screen area where the target information is located on the screen of the second terminal, so as to obtain a local photo of the screen. The local photo of the screen contains a local dot pattern. The local dot pattern is a partial dot pattern displayed on a screen area where the target information is located. As shown in FIG. 2d, a dot pattern is shown in the dashed box. The position attribute of the local dot pattern included in the local photo of the screen may indicate the location of the area of the target information on the screen of the second terminal.

Based on the above local photo of the screen including the local dot pattern, the first terminal can crop the original screenshot as follows: determine the cropping position of the original screenshot according to the position attribute of the local dot pattern included in the local photo of the screen and the position attribute of the dot pattern included in the original screenshot; the original screenshot is cropped according to the cropping position of the original screenshot to get a target screenshot. Optionally, the first terminal can compare the position attribute of the local dot pattern included in the local photo of the screen with the position attribute of the dot pattern included in the original screenshot, and determine a local area of the original screenshot that contains a local dot pattern, the cropped position of the original screenshot is then determined according to the boundary of the local area.

Figure 3C:
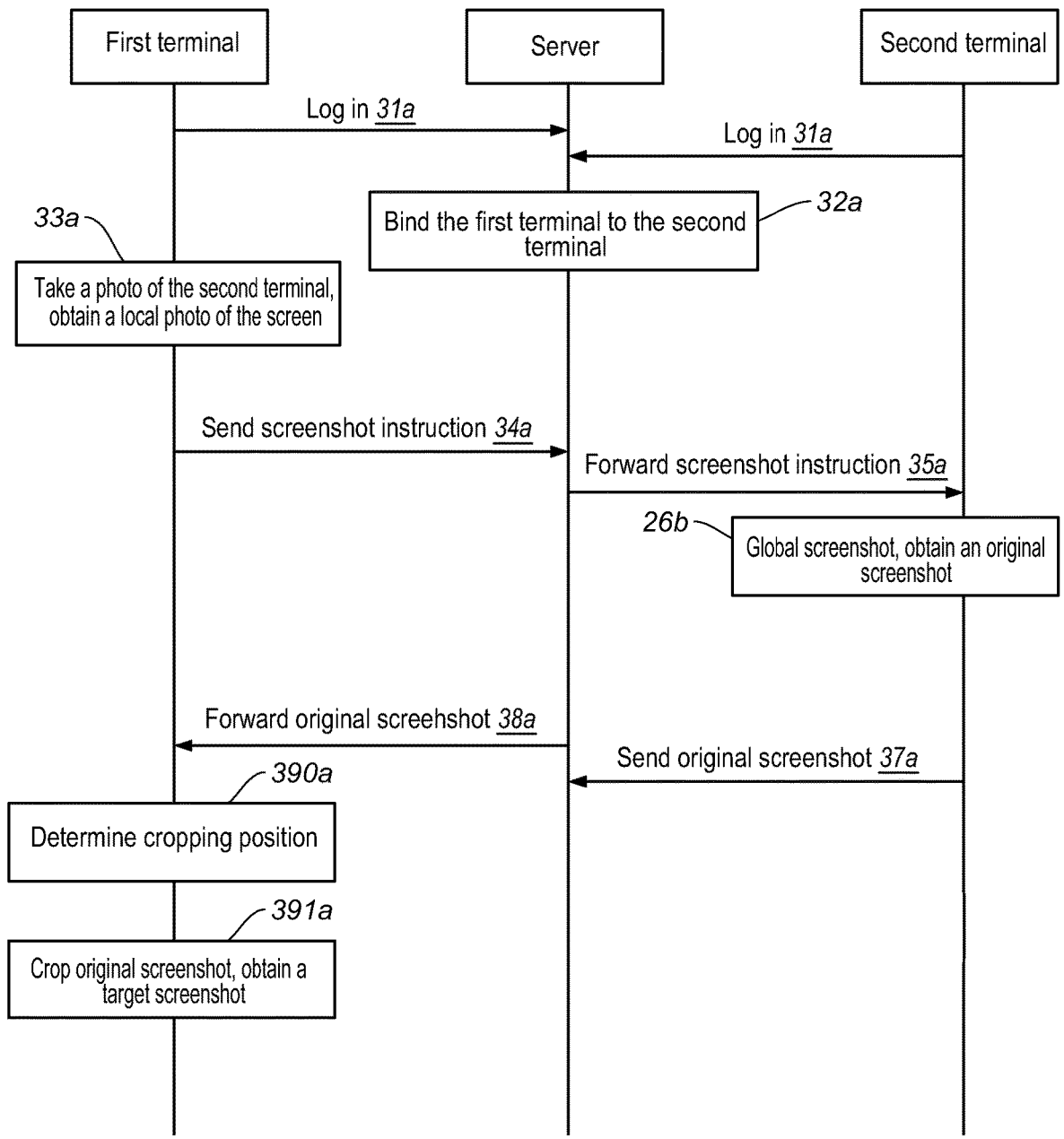
FIG. 3c is a schematic flowchart of an information transmission method described in an interactive manner according to another exemplary embodiment of the present invention.

In conjunction with the system architecture as shown in FIG. 1a, an information transmission method as shown in FIG. 3c includes the following steps:

31a. The first terminal and the second terminal log in to the server with the same registered account.

32a. The server binds the first terminal to the second terminal to establish a remote communication connection between the first terminal and the second terminal.

33a. The first terminal takes a photo on a screen area where the target information is located on the screen of the second terminal, and obtains a local photo of the screen. The screen of the second terminal displays a dot pattern, where the local photo of the screen contains a local dot pattern displayed on the screen area where the target information is located.

34a. The first terminal sends a screenshot instruction to the server.

35a. The server forwards the screenshot instruction to the second terminal.

36a. The second terminal performs a global screenshot of the screen according to the screenshot instruction to obtain an original screenshot.

37a. The second terminal sends the original screenshot to the server.

38a. The server forwards the original screenshot to the first terminal.

390a. The first terminal determines a cropping position of the original screenshot according to a position attribute of the local dot pattern included in the local photo of the screen and a position attribute of the dot pattern included in the original screenshot.

391a. The first terminal crops the original screenshot according to the cropping position of the original screenshot so as to obtain a target screenshot.

In the above embodiment, a dot pattern assist is displayed on the screen of the second terminal. The first terminal takes a photo of a screen area where the target information is located on the second terminal screen. The second terminal performs a screenshot on the screen according to the screenshot instruction of the first terminal, and sends the obtained original screenshot to the first terminal. The first terminal automatically identifies the cropping position of the original screenshot based on the position attribute of the local dot pattern included in the captured photo, and then crops the target screenshot based on the cropping position. It has the advantages of convenient operation, safety and high efficiency.

Exemplary Embodiment C

First, the exemplary embodiment C will be described from the perspective of a server.

Figure 4:
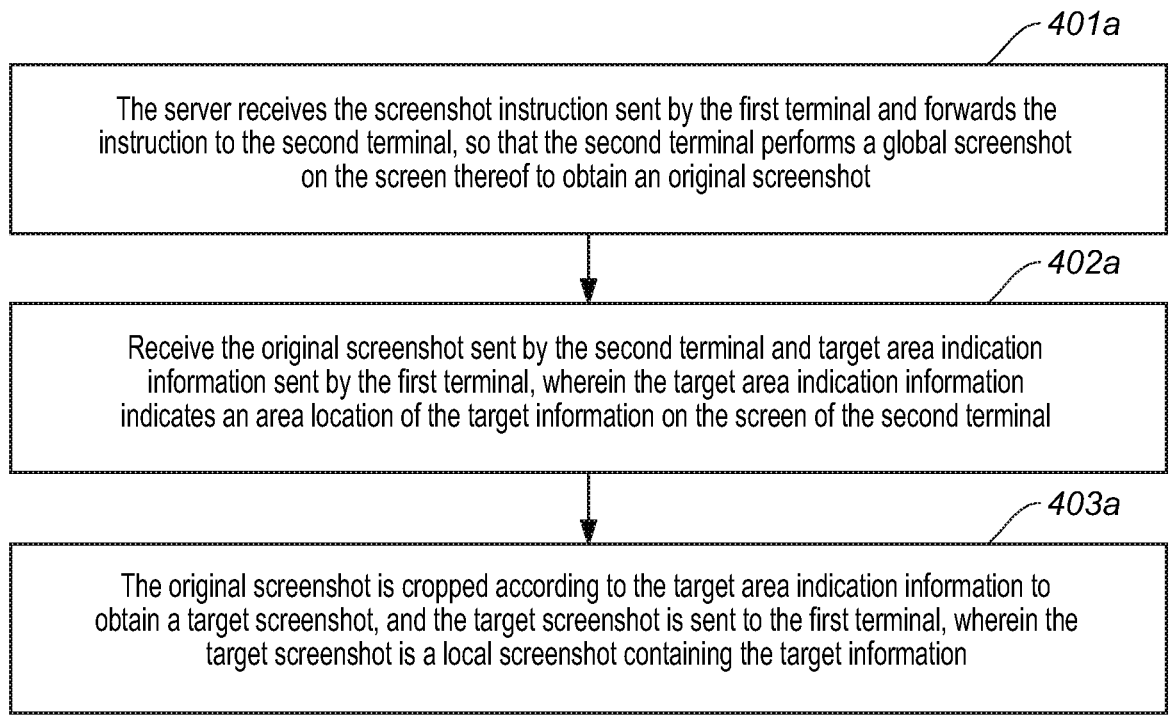
FIG. 4 is a schematic flowchart of an information transmission method described from the point of view of a server according to another exemplary embodiment of the present invention.

As shown in FIG. 4, from the perspective of a server, the process of the method of the exemplary embodiment C includes the following steps:

401a. The server receives the screenshot instruction sent by the first terminal and forwards the instruction to the second terminal, so that the second terminal performs a global screenshot on the screen thereof to obtain an original screenshot.

402a. Receive the original screenshot sent by the second terminal and target area indication information sent by the first terminal, wherein the target area indication information indicates an area location of the target information on the screen of the second terminal.

403a. The original screenshot is cropped according to the target area indication information to obtain a target screenshot, and the target screenshot is sent to the first terminal, wherein the target screenshot is a local screenshot containing the target information.

In exemplary embodiment C, information is displayed on the screen of the second terminal, which may include text, pictures, audio, video, and/or links, and the like. The first terminal needs to use part of the information displayed on the screen of the second terminal, which is simply referred to as the target information. When the first terminal needs to use the target information displayed on the screen of the second terminal, on the one hand, the server may send a screenshot instruction to the second terminal to instruct the second terminal to take a screenshot of the screen. On the other hand, the target area indication information may be acquired, and the target area indication information is sent to the server, so that the server may determine the location of the area of the target information on the screen of the second terminal according to the target area indication information. The target area indication information is used to indicate an area location of the target information on the screen of the second terminal, which may be any information form capable of indicating the location information of the target information on the screen of the second terminal.

It should be noted that the sequence of the first terminal sending a screenshot instruction to the second terminal and the target area indication information to the server is not limited herein. For example, the screenshot instruction may be sent first, and then the target area indication information may be sent, or the target area indication information is sent first, and then the screenshot instruction is sent, or the screenshot instruction and the target area indication information may be sent at the same time in parallel.

After receiving the screenshot instruction sent by the first terminal, the server may forward the screenshot instruction to the second terminal for the second terminal to perform a global screenshot on the screen. The second terminal then receives the screenshot instruction forwarded by the server, and performs a global screenshot of the screen according to the screenshot instruction to obtain an original screenshot, and then send the original screenshot to the server.

The server receives the original screenshot sent by the second terminal, and crops the original screenshot according to the target area indication information sent by the first terminal to obtain a target screenshot. The target screenshot is then sent to the first terminal. The first terminal receives a target screenshot sent by the server, wherein the target screenshot includes the required target information. After receiving the target screenshot sent by the server, the first terminal may further process the required target information based on the target screenshot. For example, the target screenshot is forwarded to another user or another terminal, or the target screenshot is saved, or some business operations are performed according to the target information in the target screenshot, such as making a payment, controlling a risk, and the like.

The target area indication information used to indicate the location of the area of the target information on the screen of the second terminal may have multiple implementation forms. The exemplary embodiment C will be further described below in conjunction with several types of target area indication information.

In embodiment c1, the first terminal may take a photo of a screen area where the target information is located on the screen of the second terminal, and obtain a local photo of the screen. The local photo of the screen can indicate the location of the area of the target information on the screen of the second terminal. In this optional embodiment, the first terminal may send a local photo of the screen to the server, wherein the partial photo of the screen carries the target area indication information. For the server, it receives the local photo of the screen sent by the first terminal, and then crops the original screenshot according to the received local photo of the screen to obtain a target screenshot.

Further, optionally, the process of cropping the original screenshot according to the local photo of the screen may be as follows: perform a correlation calculation on the local photo of the screen and the original screenshot to determine the cropping position of the original screenshot; and then cropping the original screenshot according to the cropping position of the original screenshot, so as to obtain a target screenshot.

In optional embodiment c2, a dot pattern is displayed on the screen of the second terminal, the dot pattern covers the entire screen of the second terminal, the dot pattern has a position attribute. The position attribute of the dot pattern may reflect the position of the dot pattern on the screen of the second terminal, and the position attribute of the dot pattern may be the position coordinates, color, texture, and the like of each block in the dot pattern. As shown in FIG. 2d, a schematic view of a dot pattern is provided.

In optional embodiment c2, the first terminal may take a photo of a screen area where the target information is located on the screen of the second terminal to obtain a local photo of the screen. The local photo of the screen includes a local dot pattern which is a local dot pattern displayed on a screen area where the target information is located. The dot pattern is shown in the dashed box in FIG. 2d, in which the position attribute of the local dot pattern included in the local photo of the screen may indicate the location of the area of the target information on the screen of the second terminal.

Based on the above-described local photo of the screen including the local dot pattern, in an optional embodiment c2-1, the first terminal sends a local photo of the screen including the local dot pattern to the server. For the server, it receives the local photo of the screen sent by the first terminal. Further, according to the position attribute of the local dot pattern included in the received local photo of the screen and the position attribute of the dot pattern included in the original screenshot, it determines the cropping position of the original screenshot; next, the original screenshot is cropped according to the cropping position of the original screenshot to obtain a target screenshot.

Optionally, the server may compare the position attribute of the local dot pattern included in the local photo of the screen with the position attribute of the dot pattern included in the original screenshot to determine a local area of the original screenshot including the local dot pattern, and then determine the cropping position of the original screenshot according to the boundary of the local area.

Based on the above local photo of the screen including the local dot pattern, in an optional embodiment c2-2, the first terminal may identify the position attribute of the local dot pattern from the local photo of the screen, and send the identified position attribute of the local dot pattern to the server. For the server, it receives the location attribute of the local dot pattern sent by the first terminal, and then according to the received position attribute of the local dot pattern and the position attribute of the dot pattern included in the original screenshot, it determines the cropping position of the original screenshot; next the original screenshot is cropped according to the cropping position of the original screenshot to obtain a target screenshot. The original screenshot is then cropped to obtain a target screenshot. The position attribute of the local dot pattern may be the position coordinates of each block in the local dot pattern, the color feature of each block in the local dot pattern, or the texture feature of each block in the local dot pattern.

Exemplary Embodiment D

First, the exemplary embodiment D will be described from the perspective of the second terminal.

Figure 5A:
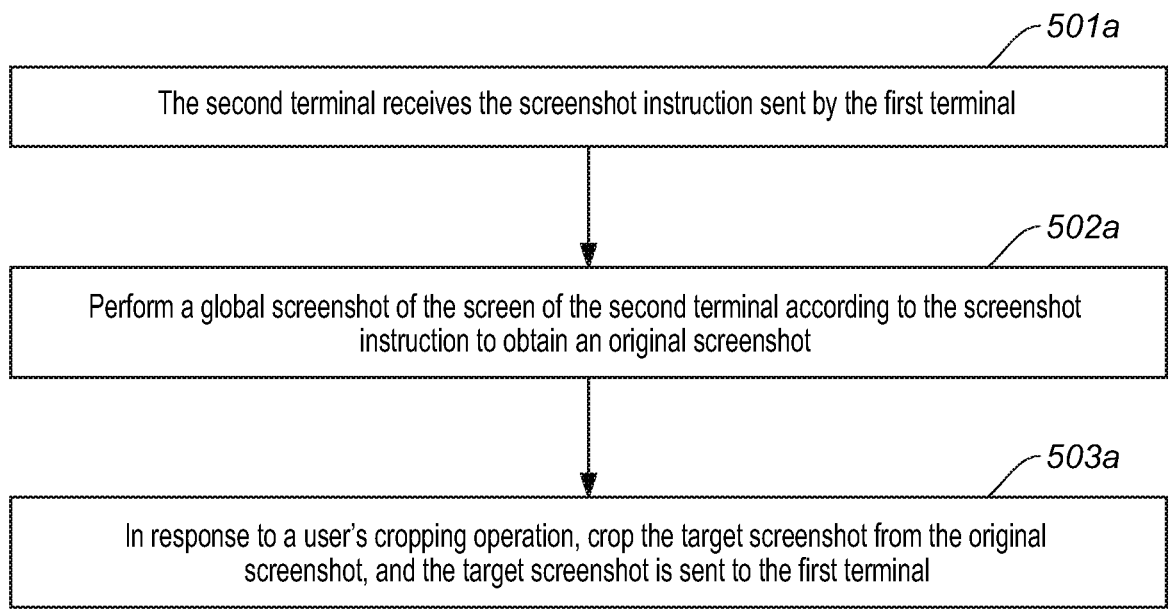
FIG. 5a is a schematic flowchart of an information transmission method described from the point of view of a second terminal according to another exemplary embodiment of the present invention.

As shown in FIG. 5a, from the perspective of the second terminal, the process of the method of the exemplary embodiment D includes the following steps:

501a. The second terminal receives the screenshot instruction sent by the first terminal.

502a. Perform a global screenshot of the screen of the second terminal according to the screenshot instruction to obtain an original screenshot.

503a. In response to a user's cropping operation, crop the target screenshot from the original screenshot, and the target screenshot is sent to the first terminal.

In exemplary embodiment D, information is displayed on the screen of the second terminal, and such information may include text, pictures, audio, video, and/or links, and the like. The first terminal needs to use part of the information displayed on the screen of the second terminal, which is simply referred to as target information. In the case where the first terminal needs to use the target information displayed on the screen of the second terminal, a screenshot instruction may be sent to the second terminal to instruct the second terminal to take a screenshot of the screen.

For the second terminal, it receives the screenshot instruction sent by the first terminal, and performs a global screenshot of the screen according to the screenshot instruction to obtain an original screenshot. Then, in response to the user's cropping operation, a target screenshot is cropped from the original screenshot and the target screenshot is then sent to the first terminal. After receiving the target screenshot sent by the second terminal, the first terminal may further process the required target information according to the target screenshot, for example, forwarding the target screenshot to another user or another terminal, or the target screenshot is saved, or some business operations are performed according to the target information contained in the target screenshot, such as making a payment, controlling a risk, and the like.

Optionally, after obtaining the original screenshot, the second terminal may display the original screenshot on its screen and display a crop related tool for the user to crop the original screenshot. In this embodiment, the user's cropping operation carries the target area indication information, for example, the position at the end of the cropping operation is the target area indication information.

Further optionally, after obtaining the original screenshot, the second terminal may output the cropping prompt information for the user to determine whether to crop the original screenshot. If the user decides to crop the original screenshot, the original screenshot and related cropping tools will be displayed on the screen. If the user determines not to crop the original screenshot, the original screenshot can be directly sent to the first terminal as a target screenshot.

Figure 5B:
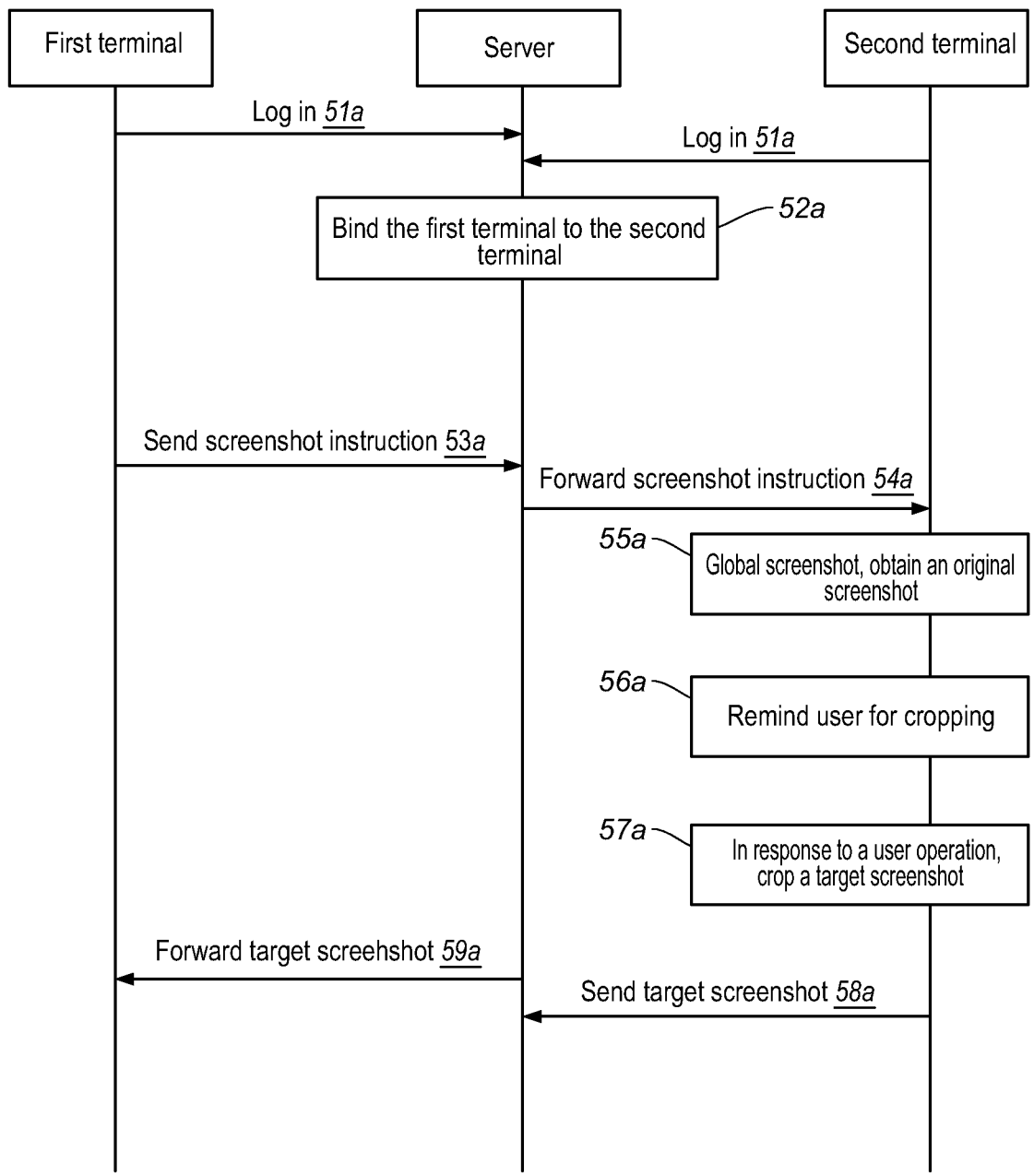
FIG. 5b is a schematic flowchart of an information transmission method described in an interactive manner according to another exemplary embodiment of the present invention.

In conjunction with the system architecture as shown in FIG. 1a, an information transmission method as shown in FIG. 5b includes the following steps:

51a. The first terminal and the second terminal log in to the server by using the same registered account.

52a. The server binds the first terminal to the second terminal to establish a remote communication connection between the first terminal and the second terminal.

53a. The first terminal sends a screenshot instruction to the server. 54a. The server forwards the screenshot instruction to the second terminal. 55a. The second terminal performs a global screenshot of the screen according to the screenshot instruction to obtain an original screenshot.

56a. The second terminal prompts the user to crop the original screenshot.

57a. The second terminal crops the target screenshot from the original screenshot in response to the user's cropping operation.

58a. The second terminal sends the target screenshot to the server.

59a. The server forwards the target screenshot to the first terminal.

In the above embodiment, the second terminal performs a screenshot of the screen thereof according to the screenshot instruction from the first terminal, obtains an original screenshot, and crops a target screenshot according to the user's cropping operation, and sends the target screenshot to the first terminal. It has the advantages of convenient operation, safety and high efficiency.

Exemplary Embodiment E

First, the exemplary embodiment E will be described from the perspective of the first terminal.

Figure 6A:
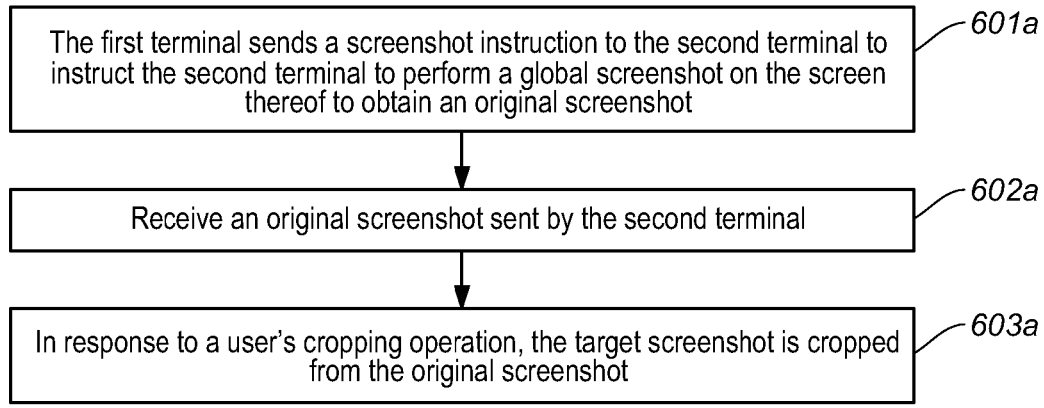
FIG. 6a is a schematic flowchart of an information transmission method described from the point of view of a first terminal according to another exemplary embodiment of the present invention.

As shown in FIG. 6a, from the perspective of the first terminal, the process of the method of the exemplary embodiment E includes the following steps:

601a. The first terminal sends a screenshot instruction to the second terminal to instruct the second terminal to perform a global screenshot on the screen thereof to obtain an original screenshot.

602a. Receive an original screenshot sent by the second terminal.

603a. In response to a user's cropping operation, the target screenshot is cropped from the original screenshot.

In exemplary embodiment E, information is displayed on the screen of the second terminal, and such information may include text, pictures, audio, video, and/or links, and the like. The first terminal needs to use part of the information displayed on the screen of the second terminal, which is simply referred to as target information. In the case where the first terminal needs to use the target information displayed on the screen of the second terminal, a screenshot instruction may be sent to the second terminal to instruct the second terminal to take a screenshot of the screen.

For the second terminal, it receives the screenshot instruction sent by the first terminal, and then performs a global screenshot according to the screenshot instruction to obtain an original screenshot, and then the original screenshot is sent to the first terminal. The first terminal receives the original screenshot sent by the second terminal and in response to the user's cropping operation, crops a target screenshot from the original screenshot, and then processes the required target information according to the target screenshot, for example, forwarding the target screenshot to another user or another terminal, or the target screenshot is saved, or some business operations are performed according to the target information contained in the target screenshot, such as making a payment, controlling a risk, and the like.

Optionally, after obtaining the original screenshot, the first terminal may display the original screenshot on its screen and display a crop related tool for the user to crop the original screenshot. In this embodiment, the user's cropping operation carries the target area indication information, for example, the position at the end of the cropping operation is the target area indication information.

Further optionally, after obtaining the original screenshot, the first terminal may output the cropping prompt information for the user to determine whether to crop the original screenshot. If the user decides to crop the original screenshot, the original screenshot and related cropping tools will be displayed on the screen. If the user determines not to crop the original screenshot, the original screenshot can be directly used as a target screenshot.

Figure 6B:
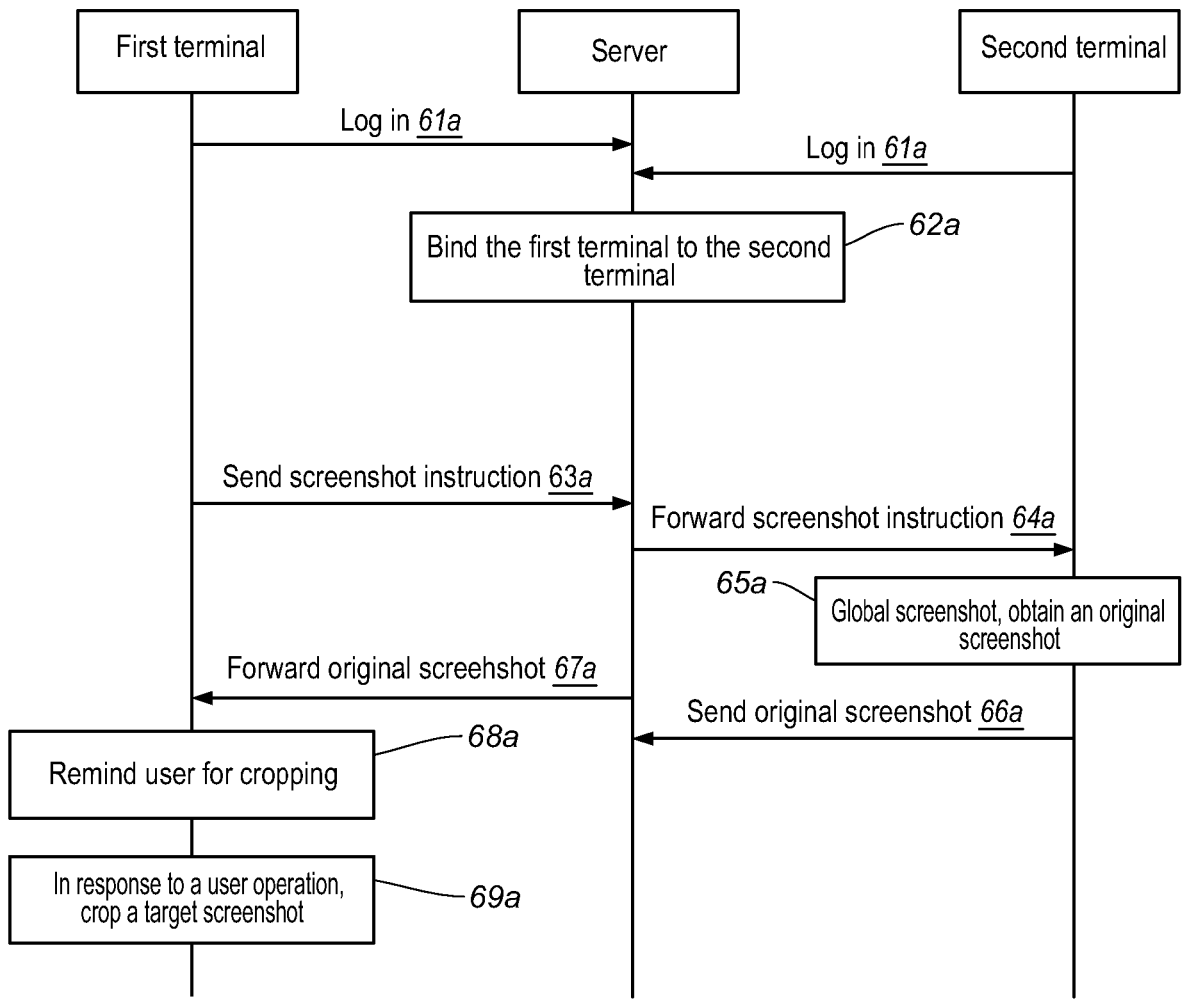
FIG. 6b is a schematic flowchart of an information transmission method described in an interactive manner according to another exemplary embodiment of the present invention.

In conjunction with the system architecture as shown in FIG. 1a, an information transmission method as shown in FIG. 6b includes the following steps:

61a. The first terminal and the second terminal log in to the server by using the same registered account.

62a. The server binds the first terminal to the second terminal to establish a remote communication connection between the first terminal and the second terminal.

63a. The first terminal sends a screenshot instruction to the server.

64a. The server forwards the screenshot instruction to the second terminal.

65a. The second terminal performs a global screenshot of the screen according to the screenshot instruction to obtain an original screenshot.

66a. The second terminal sends the original screenshot to the server.

67a. The server forwards the original screenshot to the first terminal.

68a. The first terminal prompts the user to crop the original screenshot.

69a. The first terminal crops the target screenshot from the original screenshot in response to a user's cropping operation.

In the above embodiment, the second terminal takes a screenshot of the screen according to the screenshot instruction of the first terminal, and sends the obtained original screenshot to the first terminal, and then the first terminal crops the target screenshot according to the user's cutting operation. It has the advantages of convenient operation, safety and high efficiency.

In various embodiments of the present invention, the target area indication information indicates the location of the area of the target information on the screen of the second terminal. The screen state of the second terminal can be different according to the application scenario, and the location of the area on the screen indicated by the target area indication information may also be different. For example, in some optional embodiments, the screen of the second terminal displays the desktop of the second terminal, and the location of the area on the screen indicated by the target area indication information may include a partial desktop range. For example, in another optional embodiment, a UI interface of the application is displayed on the screen of the second terminal, and the location of the area on the screen indicated by the target area indication information may include a partial interface range of the UI interface. For further example, in some optional embodiments, the UI interfaces of multiple applications are displayed on the screen of the second terminal, and the multiple UI interfaces are overlapped or tiled, the location of the area on the screen indicated by the target area indication information may include a partial interface range of at least two UI interfaces.

For further example, in some optional embodiments, a UI interface of an application and a part of the desktop are both displayed on the screen of the second terminal, and the location of the area on the screen indicated by the target area indication information may include part of the desktop range and part of the UI Interface range. In the embodiments of the present invention, the implementation manner of the location of the area on the screen indicated by the target area indication information is not limited, which can be specifically determined by the application scenario and the screenshot requirement. Correspondingly, the global screenshot and the target screenshot in the above embodiments may also include a screenshot of the UI interface of an application, or a screenshot of the desktop of the second terminal, or may also include a screenshot of both he UI interface of an application and the desktop.

In the above embodiments, the main contents of the exemplary embodiments A to E have been described in detail, and in addition to the contents described in the above embodiments, there are other contents, which will be specifically described below.

It is noted that, in the case where the above-described exemplary embodiments A to E are applied to the information transmission system shown in FIG. 1a, in some optional embodiments, all information between the first terminal and the second terminal is forwarded by the server, that is, the screenshot instruction, the local screen photo, the original screenshot, and the target screenshot between the two are all forwarded by the server. Of course, in other optional embodiments, the control type information between the first terminal and the second terminal may be forwarded by the server, for example, the screenshot instruction may be forwarded to the second terminal by using a server; for data type information between the first terminal and the second terminal, such as a local screenshot of the screen or a position attribute of a local dot pattern, a target screenshot, or an original screenshot, the first terminal and the second terminal may communicate locally between the two. The connection is sent and received without being forwarded by the server, which can help to save network resources. Optionally, the first terminal and the second terminal may establish a local communication connection through the technologies such as infrared, Bluetooth, Wi-Fi, and the like.

Further, in the foregoing exemplary embodiments A to E, when the second terminal performs a global screenshot on the screen according to the screenshot instruction, one global screenshot may be performed on the screen, thereby obtaining one frame of screenshot, and the frame of screenshot is an original screenshot; alternatively, the global screenshot of the screen may be performed according to a set screenshot frequency to get a plurality of frames of screenshot. The screenshot frequency can be adapted according to the application requirements, for example, it can be 20 times per second. The second terminal performs continuous screenshots on the screen according to the set screenshot frequency, which is especially suitable for such cases where the screen content changes rapidly. For example, if a video content is displayed on the screen of the second terminal, the second terminal may perform continuous screenshots on the screen according to a set screenshot frequency based on the screenshot instruction. A multi-frame shot is thus obtained, from which a selection can be made for an original screenshot that contains the target information desired by the user (such as a specific person or feature scene).

In the scene of consecutive screenshots, each frame of the screenshot has a corresponding screenshot time. Optionally, at least one frame screenshot with the screenshot time matching the acquisition time of the target area indication information (for example, a local photo of the screen) may be selected from the plurality of frames of screenshot as the original screenshot. Preferably, the screenshot with the same screenshot time same as the acquisition time can be used as the original screenshot. In turn, the target screenshot can be cropped from the original screenshot.

Further, in the above exemplary embodiments A to E, it may also support recording the screen. In the application scenario of the recording the screen, the first terminal may record the screen area where the target information of the second terminal is located to form a continuous photo stream; correspondingly, the second terminal adapts according to the screenshot instruction, to successively perform screenshots of the screen according to the screenshot frequency to obtain a plurality of frames of screenshots. Further, the first terminal or the second terminal may crop the target screenshot from the plurality of frames of screenshots according to the correspondence between the photo stream and the plurality of frames of screenshots, so as to form a plurality of frames of target screenshots. The plurality of frames of target screenshots are continuous in time, and thus form a video stream screenshot.

Further, in the above exemplary embodiments A to E, considering that a screenshot may cause information leakage, after the second terminal sends the target screenshot or the original screenshot to the first terminal, an alert message may be output to notify the user that the screenshot is sent, so that the user can take corresponding measures to prevent information leakage.

The manner in which the second terminal outputs the alert message may be different according to the specific implementation of the second terminal, which is not limited to the embodiments of the present invention. For example, the second terminal may output a voice prompt tone to notify the user that there is a screenshot transmission. Alternatively, the second terminal may also pop up a message box on its screen to inform the user that a screenshot is sent. Optionally, the sent target screenshot or original screenshot may also be displayed in the message box, so that the user can understand the content sent screenshot. Alternatively, the second terminal may also control a physical indicator to flash to notify the user that a screenshot is sent. Alternatively, the second terminal may also control its screen to be blinking to notify the user that a screenshot is sent.

Further, in the above exemplary embodiments A to E, considering that the screenshot may cause information leakage, before the second terminal sends the target screenshot or the original screenshot to the first terminal, the sending confirmation information may be output for the user to confirm whether to send the target screenshot or the original screenshot; afterwards, in response to the user's confirmation operation, the target screenshot or the original screenshot can be sent to the first terminal.

The manner in which the second terminal outputs the confirmation information may be different according to the implementation of the second terminal, which is not limited in the embodiments described herein. For example, the second terminal may output a confirmation box, and the confirmation box includes the prompt information about whether to send it out, and buttons such as "Yes" and "No." If the second terminal is required to send the target screenshot or the original screenshot, the user may trigger the "Yes" button by the actions of touch, mouse click, hover, etc., and the second terminal then responds to the user's trigger operation on the "Yes" button to send out the target screenshot or original screenshot to the first terminal.

Further, in the above exemplary embodiments A and D, in addition to sending the target screenshot to the first terminal, the second terminal may also grab the target information from its screen and then send the target information to the first terminal. The target information can be a piece of a word document, or a piece of code, or one or several images, or one or several hyperlinks, and the like.

Optionally, the second terminal can simulate the copy and paste operation by the events such as controlling a mouse, a pointer, and a keyboard, so as to select target information on the screen, copy the selected target information into the pasteboard, and then send the target information from the pasteboard to the first terminal. Alternatively, the second terminal may adopt a hook method to acquire a handle of the window, and then obtain the text content in the corresponding text box, that is, the target information, by means of calling the operating system.

Furthermore, it is noted that the first terminal and the second terminal can respectively install corresponding computer software, and run the corresponding computer software to implement the method logic of the above embodiments. Depending on the implementation form of the first terminal and the second terminal, the implementation form of the computer software may also be different. For example, if the first terminal or the second terminal is a mobile phone, the corresponding computer software can be implemented as an APP. Or if the first terminal or the second terminal is a mobile phone, the corresponding computer software can be implemented as a PC client. In addition, since the functions of the first terminal and the second terminal are different, the functions of the computer software corresponding to the first terminal and the second terminal are different as well. Moreover, the names of the computer software corresponding to the first terminal and the second terminal may also be different. For example, in some exemplary embodiments described above, the primary function of the first terminal is to take a photo, and the second terminal is mainly responsible for the screenshot; accordingly, the corresponding computer software installed on the first terminal may be referred to as a camera assistant, and the corresponding computer software installed on the second terminal can be called as a screenshot assistant, but they are not limited to this.

Besides, the foregoing corresponding computer software can be installed on a terminal using different operating systems, which can increase the flexibility of the first terminal and the second terminal in the configuration, and can realize cross-platform screenshot and information sharing without being restricted by the same operating system. For example, the first terminal may be a mobile phone, a tablet, or the like of iOS, and the second terminal may be a computer of Windows or the like. In another example, the first terminal may be an Android mobile phone, a tablet, etc., and the second terminal may be a Mac computer or the like. In yet another example, the first terminal may be an Android mobile phone, a tablet, etc., and the second terminal may be a Windows computer or the like. Of course, the first terminal may be an iOS mobile phone, a tablet, etc., and the second terminal may be an Android mobile phone, a tablet, or the like. Or the first terminal may also be a Windows computer or the like, and the second terminal may be a Mac computer or the like.

In addition to the information transmission methods provided by the above embodiments, the following embodiments of the present invention also provide certain data processing methods. The data processing method provided by the following embodiments of the present invention is applicable to a data processing system including a first computing device and a second computing device. Further optionally, the data processing system can also include a third computing device. In the data processing system, the first computing device, the second computing device, and the third computing device may be computer devices having functions of computing, Internet access, communication, and the like, and may be, for example, a smart phone, a tablet computer, or a wearable device.

It noted that the first computing device, the second computing device, and the third computing device may be different types of devices, or may be the same type of device. For example, the first computing device, the second computing device, and the third computing device can be smart phones. The first computing device is a smart phone, the second computing device is a personal computer, and the third computing device is another smart phone. As another example, the first computing device is a smart phone, the second computing device is a personal computer, and the third computing device is another personal computer.

In addition, the above data processing system may or may not include a server. In the case of including a server, communication between the devices in the data processing system can be relayed through the server, but is not limited thereto.

In this embodiment, when information is displayed on the user interaction interface of the second computing device, the information may include a desktop icon, a notification message, a text, a picture, audio, a video, and/or a link, etc., and the type of the information may be determined according to the specific form of the user interaction interface. In this embodiment, the user interaction interface of the second computing device may be the screen range of the second computing device, or may be the UI interface of the application, or may be the desktop range of the second computing device.

In some application scenarios, the first computing device requires partial information on the user interaction interface of the second computing device. For example, the first computing device may need to forward some of the information displayed on the user interaction interface of the second computing device to other users or other terminals. As another example, the first computing device may need to save some of the information displayed on the user interaction interface of the second computing device as a backup.

In this embodiment, the first computing device cooperates with the second computing device, and the second computing device can take a screenshot of the user interaction interface thereof, and then based on the screenshot operation of the second computing device, which is combined with the cross-screen transmission technology, the first computing device can easily and quickly obtain a target screenshot with higher definition.

For the first computing device, it may send the screenshot instruction and the target area indication information to the second computing device. The screenshot instruction is used to instruct the second computing device to perform a screenshot operation. The target area indication information is used to indicate the location of the area on the interface, and the interface includes a user interaction interface of the second computing device, so that the second computing device determines the range of the screenshot, that is, the location of the area indicated by the target area indication information.

Optionally, the first computing device may send the screenshot instruction and the target area indication information to the second computing device in the same communication process. Alternatively, the first computing device may also send the screenshot instruction and the target area indication information to the second computing device in different communication processes, and the order of sending the screenshot instruction and the target area indication information to the second computing device is not limited.

The second computing device receives a screenshot instruction and target area indication information from the first computing device, and then performs a screenshot according to the screenshot instruction, so as to obtain a target screenshot corresponding to the area location as indicated by the target area indication information. The target screenshot can then be sent to the first computing device. The first computing device receives the target screenshot returned by the second computing device. The target screenshot is a screenshot corresponding to the location of the area obtained by the second computing device by taking a screenshot of the corresponding interface.

In some application scenarios, after the first computing device obtains the target screenshot, the target screenshot may be saved locally, or the target screenshot may be saved to a cloud database or the like.

Of course, in some application scenarios, the first computing device may need to send the target screenshot to other devices, for example, a third computing device. Based on this, after the first computing device obtains the target screenshot, the target screenshot may also be sent to a third computing device.

In the case that the target screenshot is required to be sent to a third computing device, the target screenshot may be sent to the third computing device by the first computing device, or the first computing device may directly instruct the second computing device to send the target screenshot to the third computing device.

In an embodiment in which the first computing device instructs the second computing device to share the target screenshot to a third computing device, the first computing device sends the screenshot instruction and the target region indication information to the second computing device, and sends the information of the range of sharing to the second computing device, for the second computing device to send the target screenshot to the third computing device indicated by the information of the range of sharing. The information of the range of sharing points to a third computing device that needs to share the target screenshot, for example, it may include the identification information of the third computing device. The second computing device receives the screenshot instruction, the target area indication information, and the information of the range of sharing from the first computing device, and then performs a screenshot according to the screenshot instruction, so as to obtain a target screenshot corresponding to the location of the area indicated by the target area indication information. Thereafter, the target screenshot can be sent to the third computing device indicated by the information of the range of sharing. In this embodiment, the target screenshot does not need to be transferred by the first computing device, but is directly sent by the second computing device to the third computing device, which can reduce the transmission process of the target screenshot, and helps to save transmission resources.

Optionally, the first computing device may send the screenshot instruction, the target area indication information, and the information of sharing range to the second computing device in the same communication process. Alternatively, the first computing device may also send the screenshot instruction, the target area indication information, and the information of sharing range to the second computing device in two or three different communication processes, respectively, which is not limited to the order in which the second computing device sends the screenshot instruction, the target area indication information, and the information of sharing range.

Optionally, the third computing device that needs to share the target screenshot may be one or more devices. In addition, the third computing device can be another computing device different from the first computing device and the second computing device, but is not limited thereto. For example, the third computing device can also be within the sharing range of the target screenshot, that is, the third computing device can include the second computing device.

In the above embodiment of data processing method, the concepts of the screenshot instruction, the target area indication information, and the target screenshot are also involved. For some optional implementation forms of these concepts and related descriptions, reference may be made to the description of the same concept in the foregoing embodiments of information transmission method, but is not limited thereto.

In the above data processing method embodiment, when the information on the user interaction interface of the second computing device needs to be shared or is needed, the second computing device may perform a screenshot of the user interaction interface, based on the screenshot operation of the second computing device, which is combined with the cross-screen transmission technology, the target screenshot sharing can be conveniently and quickly completed. Further, since the second computing device performs a screenshot operation on the user interaction interface thereof, the screenshot is relatively less affected by interference factors such as the screen refresh frequency, and the like, such that compared to directly taking a photo of the user interaction interface of the second computing device, the quality of the target screenshot is relatively high, in addition, the information sharing based on the target screenshot helps to ensure better information clarity and user experience.

It is noted that some of the processes described in the above embodiments and the accompanying drawings include a plurality of operations in a specific order, but it should be clearly understood that the operations may not be performed in the order in which they appear or performed in parallel, the serial numbers of the operations such as 201a, 202a, etc. are only used to distinguish different operations, and the serial numbers themselves do not represent any execution order. Additionally, these processes may include more or fewer operations, and these operations may be performed sequentially or in parallel. It should be noted that the descriptions of "first" and "second" in this document are used to distinguish different messages, devices, modules, and the like, and do not represent the order of execution or define that the "first" and "second" are in different types.

Figure 7A:
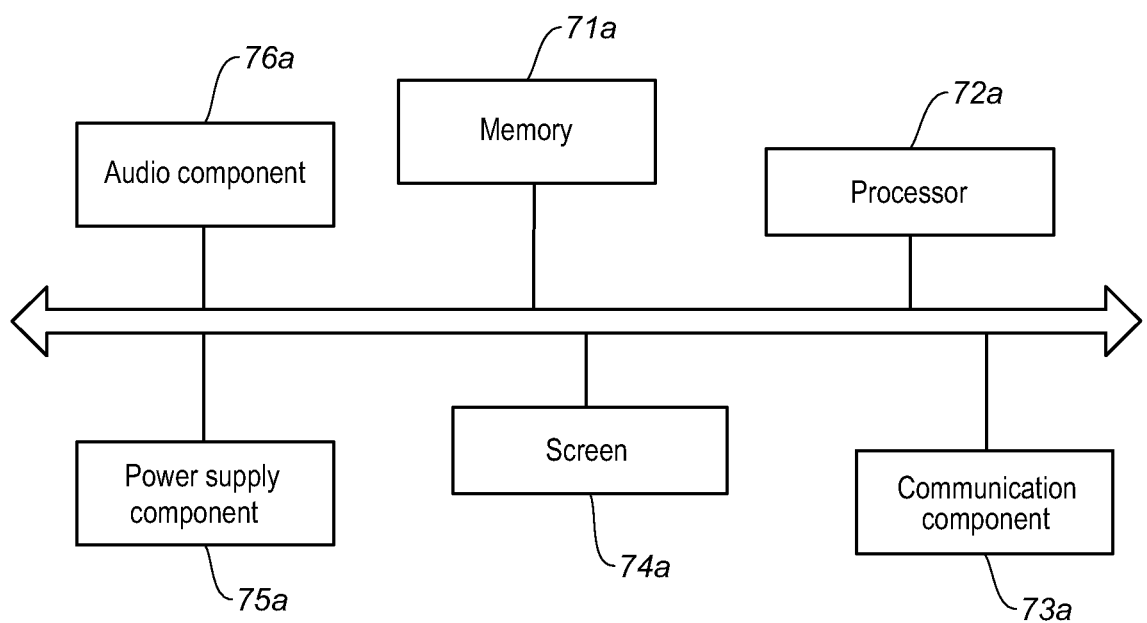
FIG. 7a is a schematic structural view of a terminal according to an exemplary embodiment of the present invention.

FIG. 7a is a schematic structural view of a terminal according to an exemplary embodiment of the present invention. The terminal provided in this embodiment can be implemented as the second terminal in the foregoing method embodiment. As shown in FIG. 7a, the terminal includes: a memory 71a, a processor 72a, and a communication component 73a.

The communication component 73a is configured to receive a screenshot instruction and target area indication information sent by the first terminal, wherein the target area indication information indicates an area location of the target information on the screen of the second terminal.

The memory 71a is configured to store a computer program and can be configured to store other various data to support operations on the second terminal. Examples of such data include instructions for any application or method operating on the second terminal, contact data, phone book data, messages, pictures, videos, and the like.

The processor 72a is configured to execute a computer program stored in the memory 71a for:

performing a screenshot of the screen of the second terminal according to the screenshot instruction and the target area indication information to obtain a target screenshot, wherein the target screenshot is a local screenshot containing the target information;

the target screenshot is sent to the first terminal by the communication component 73a for the first terminal to process the target screenshot.

In an optional embodiment, when the processor 72a takes a screenshot of the screen of the second terminal to obtain a target screenshot, the processor is specifically configured for:

performing a global screenshot of the screen of the second terminal according to the screenshot instruction to obtain an original screenshot, and cropping the original screenshot according to the target area indication information to obtain a target screenshot; or determining, according to the target area indication information, a screen area where the target information is located on the screen of the second terminal, and then performing a screenshot of the screen area where the target information is located on the screen of the second terminal according to the screenshot instruction so as to obtain a target screenshot.

In an optional embodiment, the communication component 73a is specifically configured to: receive a local photo of the screen sent by the first terminal, where the local photo of the screen is obtained by taking a photo of the screen area where the target information is located on the screen of the second terminal. The local photo of the screen carries the target area indication information.

Based on the above, when cropping the original screenshot according to the target area indication information to obtain the target screenshot, the processor 72a performs: a correlation calculation with the local photo of the screen and the original screenshot to determine a cropping position of the original screenshot; and cropping the original screenshot based on the cropping position of the original screenshot to obtain the target screenshot.

In an optional embodiment, as shown in FIG. 7a, the second terminal further includes a screen 74a on which a dot pattern is displayed, and the dot pattern has a position attribute. On this basis, the communication component 73a receives the local photo of the screen including a local dot pattern which is a partial dot pattern displayed on the screen area where the target information is located.

Based on the above, the processor 72a crops the original screenshot according to the target area indication information to obtain the target screenshot, the processor is specifically configured for: according to the position attribute of the local dot pattern included in the local photo of the screen and the dot pattern included in the original screenshot, determining the cropping position of the original screenshot; cropping the original screenshot based on the cropping position of the original screenshot to obtain the target screenshot.

Alternatively, on the basis of displaying the dot pattern on the screen 74a, the communication component 73a is specifically configured to: receive a position attribute of the local dot pattern sent by the first terminal, wherein the position attribute of the local dot pattern is identified by the first terminal from the local photo of the screen. Based on this, the processor 72 crops the original screenshot according to the target area indication information to obtain the target screenshot, and the processor is specifically configured for: determining the cropping position of the original screenshot according to the position attribute of the local dot pattern and the position attribute of the dot pattern included in the original screenshot; and then cropping the original screenshot according to the cropping position to get the target screenshot.

Optionally, the position attribute of the dot pattern includes at least one of position coordinates, color, and texture of each block in the dot pattern.

In an optional embodiment, when the processor 72a performs a global screenshot of the screen of the second terminal according to the screenshot instruction to obtain the original screenshot, the processor is specifically configured for: according to the screenshot instruction, performing a global screenshot of the screen of the second terminal based on the set screenshot frequency to obtain multiple screenshot frames; selecting at least one frame with its screenshot time matching the acquisition time of the target area indication information from the multiple screenshot frames to be the original screenshot.

In an optional embodiment, the processor 72a is further configured to: output a confirmation message for the user to confirm whether to send the target screenshot; and in response to the user's confirmation operation, send the target screenshot to the first terminal through the communication component 73a.

In an optional embodiment, the processor 72a is further configured to: after the communication component 73a sends the target screenshot to the first terminal, output an alert message to notify the user that there is a screenshot transmission.

In an optional embodiment, the processor 72a is further configured to: grab the target information from the screen of the second terminal; and send the target information to the first terminal by using the communication component 73a.

In an optional embodiment, the processor 72a is further configured to: log in to the server with the first terminal based on the same registered account to establish a remote communication connection with the first terminal through the server.

In an optional embodiment, the processor 72a is specifically configured to: send a target screenshot to the first terminal by using the communication component 73a based on a local communication connection with the first terminal.

Further, as shown in FIG. 7a, the second terminal further includes: a power supply component 75a, an audio component 76a, and the like. However, only some of the components are schematically illustrated in FIG. 7a, and it is not meant that the second terminal only includes the components shown in FIG. 7a.

Correspondingly, an embodiment of the present invention further provide a computer readable storage medium storing a computer program, which can implement the steps or operations that can be performed by the second terminal in the above exemplary embodiment A when the computer program is executed.

Figure 7B:
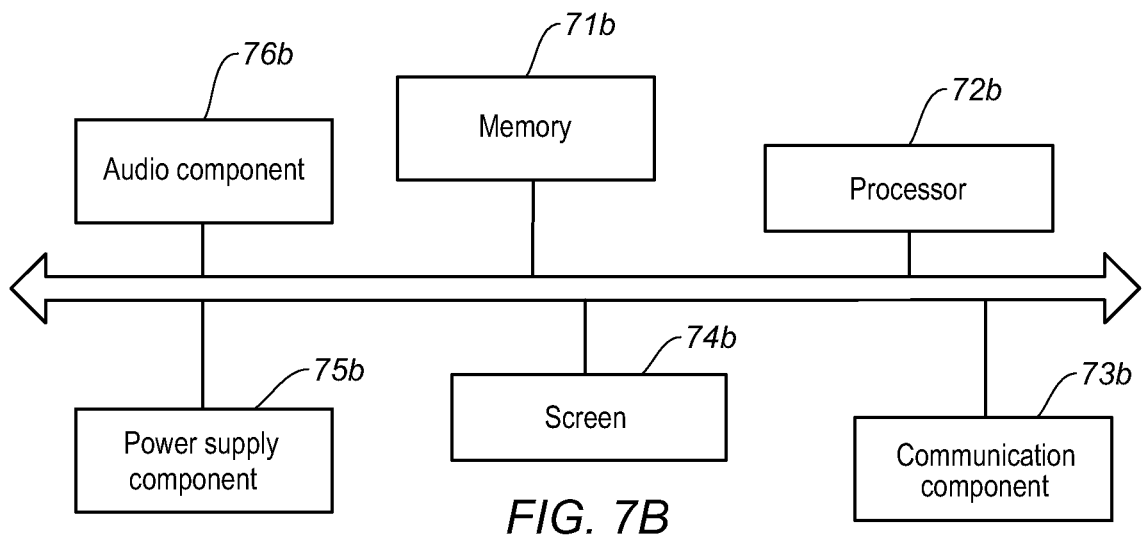
FIG. 7b is a schematic structural view of another terminal according to an exemplary embodiment of the present invention.

FIG. 7b is a schematic structural view of another terminal according to an exemplary embodiment of the present invention. The terminal provided by this embodiment can be implemented as the first terminal in the foregoing method embodiment. As shown in FIG. 7b, the terminal includes: a memory 71b, a processor 72b, and a communication component 73b.

The memory 71b is used for storing a computer program and can be configured to store other various data to support operations on the second terminal. Examples of such data include instructions for any application or method operating on the second terminal, contact data, phone book data, messages, pictures, videos, and the like.

The processor 72b is configured to execute a computer program stored in the memory 71b for:

sending, by the communication component 73b, a screenshot instruction and target area indication information to the second terminal, wherein the target area indication information is used to indicate an area location of the target information on a screen of the second terminal;

receiving, by the communication component 73b, a target screenshot sent by the second terminal, wherein the target screenshot is a local screenshot containing the target information obtained by means of the second terminal performing a screenshot on the screen of the second terminal according to the screenshot instruction and the target area indication information.

In an optional embodiment, the processor 72b is specifically configured to: take a photo of a screen area where the target information is located on a screen of the second terminal, to obtain a local photo of the screen; and then send the local photo of the screen to the second terminal via the communication component 73b, wherein the local photo of the screen comprises the target area indication information.

In an optional embodiment, a dot pattern is displayed on a screen of the second terminal, and the dot pattern has a position attribute; a local photo of the screen includes a local dot pattern, which is a partial dot pattern displayed on a screen area where the target information is located. Based on this, the processor 72b is specifically configured to: send, by the communication component 73b, a local photo of the screen including the local dot pattern to the second terminal. Alternatively, the processor 72b may be specifically configured to: identify a position attribute of the local dot pattern included in the screen photo, and send the position attribute of the local dot pattern to the second terminal by the communication component 73b.

In an optional embodiment, the processor 72b is specifically configured to: receive, according to a local communication connection with the second terminal, the target screenshot sent by the second terminal via the communication component 73b.

Moreover, as shown in FIG. 7b, the first terminal further includes: a screen 74b, a power supply component 75b, an audio component 76b, and the like. However, only some of the components are schematically illustrated in FIG. 7b, and it is not meant that the first terminal only includes the components shown in FIG. 7b.

Correspondingly, the embodiment of the present invention further provides a computer readable storage medium storing a computer program, which implements the steps or operations that can be performed by the first terminal in the above exemplary embodiment A when the computer program is executed.

Figure 8A:
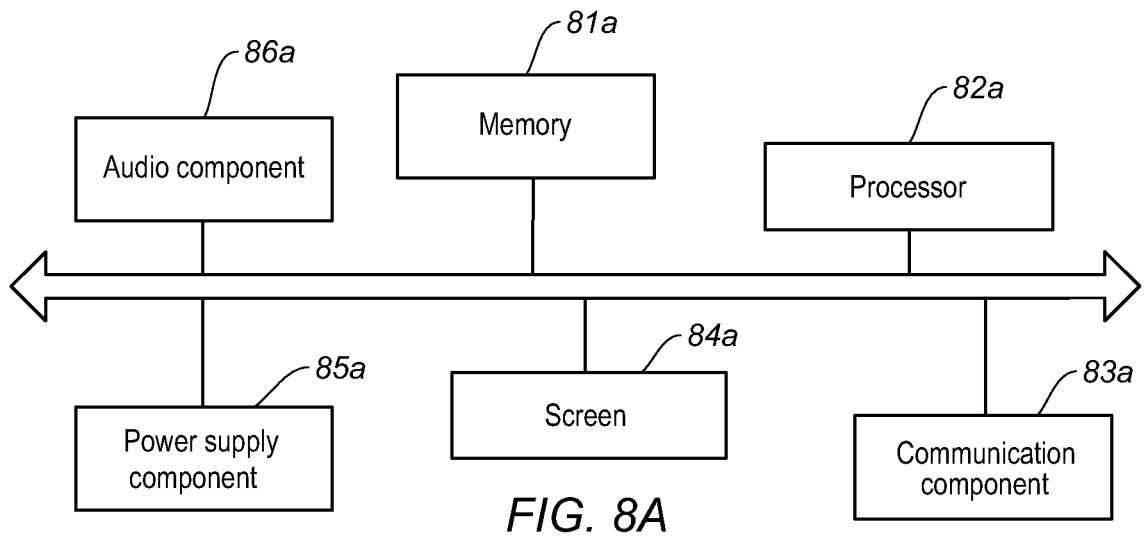
FIG. 8a is a schematic structural view of a terminal according to another exemplary embodiment of the present invention.

FIG. 8a is a schematic structural view of a terminal according to another exemplary embodiment of the present invention. The terminal provided in this embodiment may be implemented as the first terminal in the foregoing method embodiment. As shown in FIG. 8a, the terminal includes: a memory 81a, a processor 82a, and a communication component 83a.

The memory 81a is used for storing a computer program and can be configured to store other various data to support operations on the first terminal. Examples of such data include instructions for any application or method operating on the first terminal, contact data, phone book data, messages, pictures, videos, and the like.

The processor 82a is configured to execute a computer program stored in the memory 81a for:

taking a photo of the screen area where the target information is located on the screen of the second terminal, and obtaining a partial photo of the screen;

sending a screenshot instruction to the second terminal by the communication component 83a to instruct the second terminal to perform a global screenshot of the screen, and receiving the original screenshot sent back by the second terminal;

cropping the original screenshot according to the local photo of the screen to obtain a target screenshot, wherein the target screenshot is a local screenshot containing the target information.

In an optional embodiment, when the processor 82a crops the original screenshot according to the partial photo of the screen to obtain a target screenshot, the processor is specifically configured to: perform correlation calculation on the local photo of the screen and the original screenshot to determine the cropping position of the original screenshot; and cropping the original screenshot according to the crop position of the original screenshot to get the target screenshot.

In an optional embodiment, a dot pattern may be displayed on the screen of the second terminal, the dot pattern covers the entire screen of the second terminal, and the dot pattern has a position attribute. The position attribute of the dot pattern may reflect the position of the dot pattern on the screen of the second terminal, and the position attribute of the dot pattern may be the position coordinates, the color, the texture, and the like of each block in the dot pattern. Based on this, the processor 82a uses a local dot pattern of the captured local photo of the screen. Based on this, when the processor crops the original screenshot according to the local photo of the screen to obtain a target screenshot, the processor 82a is specifically configured to:

determine the cropping position of the original screenshot according to the position attribute of the local dot pattern included in the partial photo of the screen and the position attribute of the dot pattern included in the original screenshot;

crop the original screenshot according to the cropping position of the original screenshot to get a target screenshot.

Moreover, as shown in FIG. 8a, the first terminal further includes: a screen 84a, a power supply component 85a, an audio component 86a, and the like. However, only some of the components are schematically illustrated in FIG. 8a, and it is not meant that the first terminal only includes the components shown in FIG. 8a.

Correspondingly, an embodiment of the present invention further provides a computer readable storage medium storing a computer program, which implements the steps or operations that can be performed by the first terminal in the above exemplary embodiment B when the computer program is executed.

Figure 8B:
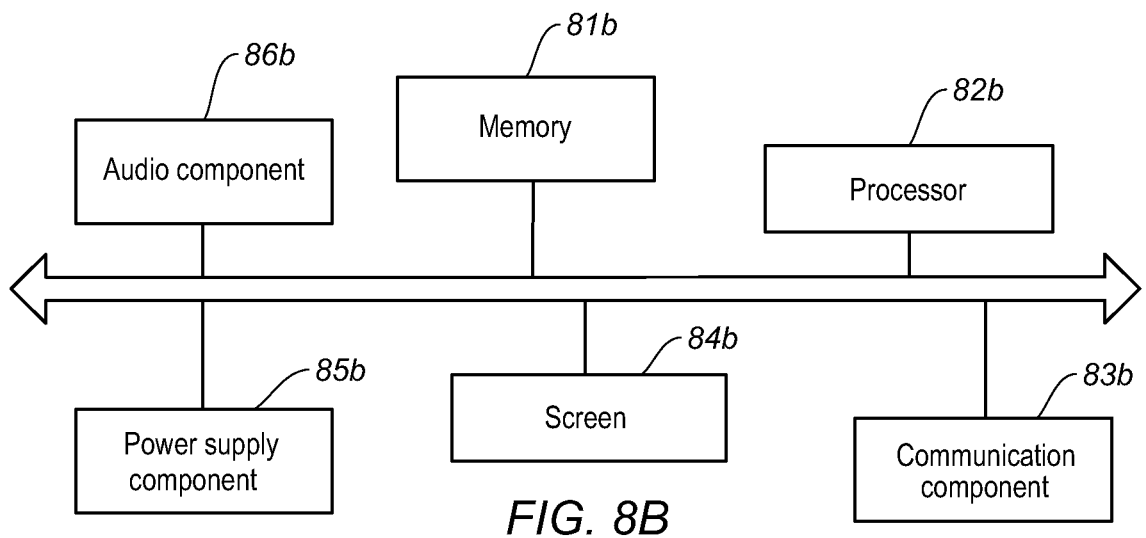
FIG. 8b is a schematic structural view of another terminal according to another exemplary embodiment of the present invention.

FIG. 8b is a schematic structural view of another terminal according to another exemplary embodiment of the present invention. The terminal provided in this embodiment may be implemented as the second terminal in the foregoing method embodiment. As shown in FIG. 8b, the terminal includes a memory 81b, a processor 82b, and a communication component 83b.

The memory 81b is used for storing a computer program and can be configured to store other various data to support operations on the second terminal. Examples of such data include instructions for any application or method operating on the second terminal, contact data, phone book data, messages, pictures, videos, and the like.

The processor 82b is configured to execute a computer program stored in the memory 81b for:

receiving, by the communication component 83b, a screenshot instruction sent by the first terminal;

performing a global screenshot on the screen of the second terminal according to the screenshot instruction to obtain an original screenshot;

sending the original screenshot to the first terminal by the communication component 83b, for the first terminal to crop a target screenshot from the original screenshot, wherein the target screenshot is a local screenshot containing the target information.

Moreover, as shown in FIG. 8*b*, the second terminal further includes: a screen 84*b*, a power supply component 85*b*, an audio component 86*b*, and the like. However, only some of the components are schematically illustrated in FIG. 8*b*, and it is not meant that the second terminal only includes the components shown in FIG. 8*b*.

Correspondingly, the embodiment of the present invention further provides a computer readable storage medium storing a computer program, which implements the steps or operations that can be performed by the second terminal in the above exemplary embodiment B when the computer program is executed.

Figure 9:
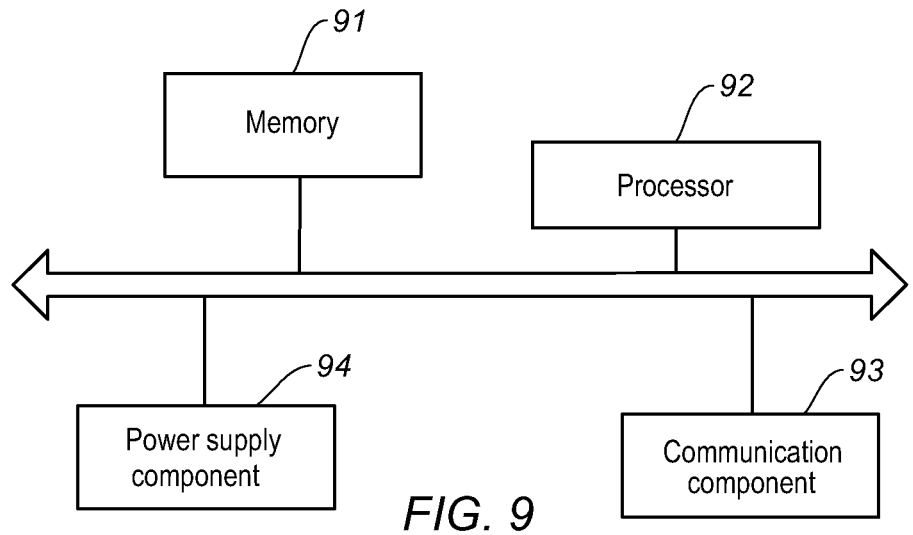
FIG. 9 is a schematic structural view of a server according to an exemplary embodiment of the present invention.

FIG. 9 is a schematic structural view of a server according to another exemplary embodiment of the present invention. As shown in FIG. 9, the server includes a memory 91, a processor 92, and a communication component 93.

The communication component 93 is configured to receive a screenshot instruction sent by the first terminal and forward the instruction to the second terminal, so that the second terminal performs a global screenshot of the screen thereof to obtain an original screenshot; and receive the original screenshot sent by the second terminal and the target area indication information sent by the first terminal, wherein the target area indication information indicates an area location of the target information on a screen of the second terminal.

The memory 91 is for storing a computer program and can be configured to store other various data to support operations on the server. Examples of such data include instructions for any application or method operating on the server, contact data, phone book data, messages, pictures, videos, and the like.

The processor 92 is configured to execute a computer program stored in the memory 91 for:

cropping the original screenshot according to the target area indication information to obtain a target screenshot; and sending, by the communication component, the target screenshot to the first terminal, wherein the target screenshot is a local screenshot containing the target information.

In an optional embodiment, the communication component 93 is specifically configured to: receive a local photo of the screen sent by the first terminal, wherein the local photo of the screen is obtained by means of the first terminal taking a photo of a screen area where the target information on the screen of the second terminal. When the processor 92 crops the original screenshot according to the target area indication information to obtain a target screenshot, it is specifically configured to perform a correlation calculation on the local photo of the screen and the original screenshot to determine a cropping position of the original screenshot; and then cropping the original screenshot according to the cropping position of the original screenshot to get a target screenshot.

In an optional embodiment, a dot pattern may be displayed on the screen of the second terminal, the dot pattern covers the entire screen of the second terminal, and the dot pattern has a position attribute. The position attribute of the dot pattern may reflect the position of the dot pattern on the screen of the second terminal, and the position attribute of the dot pattern may be the position coordinates, the color, the texture, and the like of each block in the dot pattern. Based on this, the communication component 93 is specifically configured to: receive a local photo of the screen sent by the first terminal, wherein the local photo of the screen includes a local dot pattern, which is a partial dot pattern displayed on a screen area where the target information is located. Correspondingly, when the processor 92 crops the original screenshot according to the target area indication information to obtain a target screenshot, it is specifically configured to, according to the position attribute of the local dot pattern included in the received local photo of the screen and the position attribute of the dot pattern included in the original screenshot, determine the cropping position of the original screenshot; and then cropping the original screenshot according to the cropping position of the original screenshot to obtain the target screenshot.

In an optional embodiment, the communication component 93 is specifically configured to: receive a position attribute of a local dot pattern sent by the first terminal. Correspondingly, when the processor 92 crops the original screenshot according to the target area indication information to obtain a target screenshot, it is configured to, according to the position attribute of the received local dot pattern and the position attribute of the dot pattern included in the original screenshot, determine the cropping position of the original screenshot; and then crop the original screenshot according to the cropping position of the original screenshot so as to get the target screenshot.

Moreover, as shown in FIG. 9, the server further includes other components such as a power supply component 94. However, only some of the components are schematically illustrated in FIG. 9, and it is not meant that the server includes only the components shown in FIG. 9.

Correspondingly, the embodiment of the present invention further provides a computer readable storage medium storing a computer program, which implements the steps or operations executable by the server in the above exemplary embodiment C when the computer program is executed.

Figure 10:
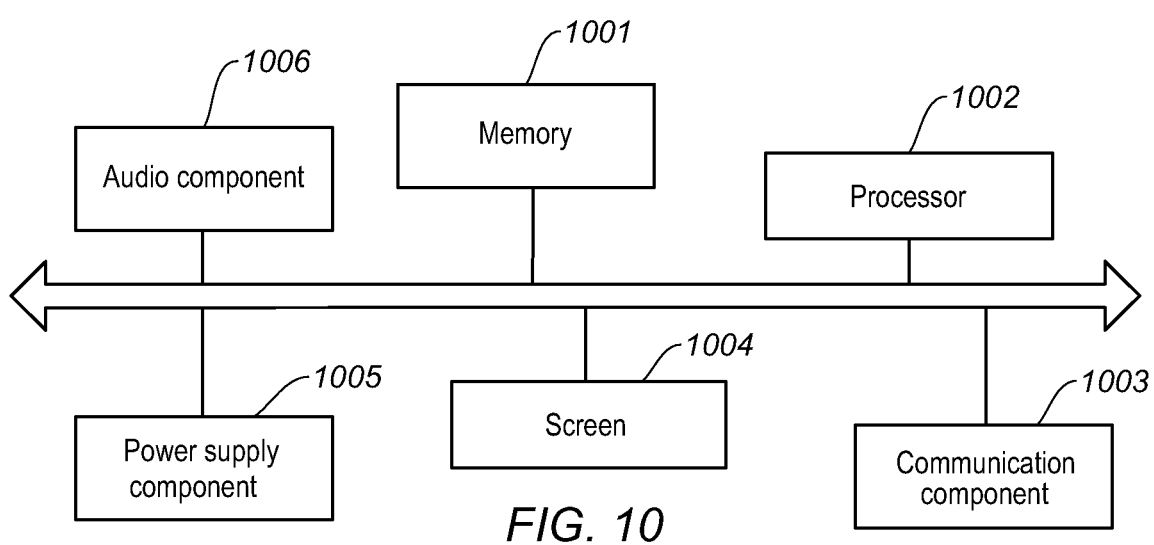
FIG. 10 is a schematic structural view of a terminal according to another exemplary embodiment of the present invention.

FIG. 10 is a schematic structural view of a terminal according to another exemplary embodiment of the present invention. The terminal provided in this embodiment may be implemented as the second terminal in the foregoing method embodiment. As shown in FIG. 10, the terminal includes a memory 1001, a processor 1002, and a communication component 1003.

The memory 1001 is configured to store a computer program and can be configured to store other various data to support operations on the second terminal. Examples of such data include instructions for any application or method operating on the second terminal, contact data, phone book data, messages, pictures, videos, and the like.

The processor 1002 is configured to execute a computer program stored in the memory 1001 for:

receiving, by the communication component 1003, a screenshot instruction sent by the first terminal;

performing a global screenshot on the screen of the second terminal according to the screenshot instruction to obtain an original screenshot;

in response to the user's cropping operation, cropping a target screenshot from the original screenshot, and then sending the target screenshot to the first terminal by the communication component 1003.

In an optional embodiment, the processor 1002 is further configured to: after obtaining the original screenshot, display the original screenshot on the screen thereof, and display the crop related tool for the user to crop the original screenshot.

Moreover, the processor 1002 is further configured to: after obtaining the original screenshot, output the cropping prompt information for the user to determine whether to crop the original screenshot; if the user determines to crop the original screenshot, display the original screenshot on the screen and a related cropping tool; if the user determines not to crop the original screenshot, sends the original screenshot directly to the first terminal as a target screenshot.

Further, as shown in FIG. 10, the second terminal further includes: a screen 1004, a power component 1005, an audio component 1006, and the like. However, only some of the components are schematically illustrated in FIG. 10, and it is not meant that the second terminal includes only the components shown in FIG. 10.

Correspondingly, the embodiment of the present invention further provides a computer readable storage medium storing a computer program, which can implement the steps or operations that can be performed by the second terminal in the above exemplary embodiment D when the computer program is executed.

Figure 11:
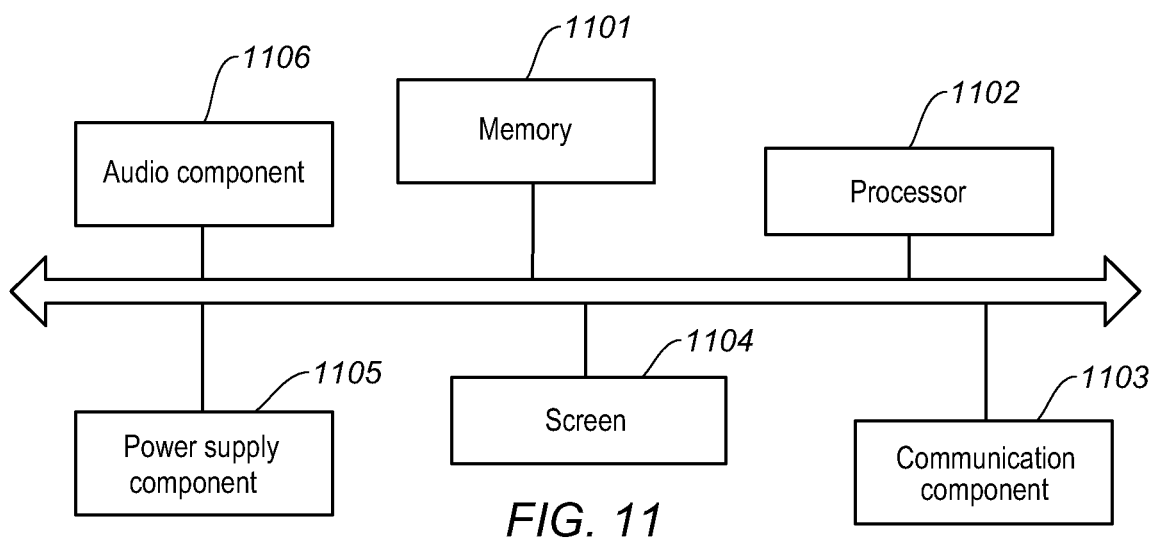
FIG. 11 is a schematic structural view of a terminal according to another exemplary embodiment of the present invention.

FIG. 11 is a schematic structural view of a terminal according to another exemplary embodiment of the present invention. The terminal provided in this embodiment can be implemented as the first terminal in the foregoing method embodiment. As shown in FIG. 11, the terminal includes a memory 1101, a processor 1102, and a communication component 1103.

The memory 1101 is configured to store a computer program and can be configured to store other various data to support operations on the first terminal. Examples of such data include instructions for any application or method operating on the first terminal, contact data, phone book data, messages, pictures, videos, and the like.

The processor 1102 is configured to execute a computer program stored in the memory 1101, for:

sending a screenshot instruction to the second terminal by the communication component 1103 to instruct the second terminal to perform a global screenshot on the screen to obtain an original screenshot;

receiving, by the communication component 1103, the original screenshot sent by the second terminal;

in response to a user's cropping operation, cropping a target screenshot from the original screenshot.

In an optional implementation, the processor 1102 is further configured to: after receiving the original screenshot, display the original screenshot on its screen 1104, and display a crop related tool for the user to crop the original screenshot.

Moreover, the processor 1102 is further configured to: after receiving the original screenshot, output the cropping prompt information for the user to determine whether to crop the original screenshot; if the user determines to crop the original screenshot, the original screenshot and related cropping tools are displayed on the screen; if the user determines not to crop the original screenshot, the original screenshot can be directly taken as the target screenshot.

In addition, as shown in FIG. 11, the first terminal further includes: a screen 1104, a power component 1105, an audio component 1106, and the like. However, only some of the components are schematically illustrated in FIG. 11, and it is not meant that the first terminal includes only the components shown in FIG. 11.

Correspondingly, the embodiment of the present invention further provides a computer readable storage medium storing a computer program, which can implement the steps or operations that can be performed by the first terminal in the above exemplary embodiment E when the computer program is executed.

The embodiment of the present invention further provides a first computing device, wherein the first computing device includes: a memory, a processor, and a communication component.

The memory is use for storing a computer program and configured to store other various data to support operation on the first computing device. Examples of such data include instructions for any application or method operating on the first computing device, contact data, phone book data, messages, pictures, videos, and the like.

The processor for executing a computer program stored in the memory for:

sending the screenshot instruction and the target area indication information to the second computing device through the communication component, and the target screenshot sent back by the second computing device is received by the communication component. The target area indication information is used to indicate an area location on the interface, and the interface includes a user interaction interface of the second computing device; the target screenshot is a screenshot corresponding to the location of the area obtained by means of the second computing device taking a screenshot of the interface.

The communication component is used to send a screenshot instruction and target area indication information to the second computing device; and receive a target screenshot sent back by the second computing device.

Optionally, in a scenario that it needs to share the target screenshot with a third computing device, the processor may be further configured to: send, by the communication component, the information of sharing range to the second computing device, wherein the second computing device sends the target screenshot to the third computing device as indicated by the information of sharing range. It should be noted that if the third computing device does not include the first computing device, the second computing device may not send back the target screenshot to the first computing device. That is, the communication component of the first computing device may only send the screenshot instruction, the target area indication information, and the information of sharing range to the second computing device, but will not receive the target screenshot sent by the second computing device.

Further, the first computing device may also include: a screen, a power supply component, an audio component, and the like.

Correspondingly, the embodiment of the present invention further provides a computer readable storage medium storing a computer program, which when executed, can implement various steps or operations that can be performed by the first computing device in the above exemplary embodiment.

The embodiment of the present invention further provides a second computing device, where the second computing device includes: a memory, a processor, and a communication component.

The memory is used for storing a computer program and configured to store other various data to support operation on the second computing device. Examples of such data include instructions for any application or method operating on a second computing device, contact data, phone book data, messages, pictures, videos, and the like.

The processor is used for executing a computer program stored in the memory for:

receiving a screenshot instruction and target area indication information from the first computing device through the communication component, where the target area indication information is used to indicate an area location on the interface, the interface includes a user interaction interface of the second computing device; performing a screenshot on the interface to obtain a target screenshot corresponding to the location of the area; and sending back the target screenshot to the first computing device via the communication component.

The communication component is used for receiving the screenshot instruction and the target area indication information from the first computing device, and sending the target screenshot to the first computing device.

In an optional implementation, the processor is further configured to: receive the information of sharing range from the first computing device by using the communication component, and send the target screenshot to the third computing device indicated by the information of sharing range through the communication component. Correspondingly, the communication component is further configured to: receive the information of sharing range from the first computing device, wherein the information of sharing range is used to indicate the third computing device that needs to share the target screenshot, the target screenshot is sent to the third computing device indicated by the information of sharing range. It should be noted that if the third computing device does not include the first computing device, the communication component of the second computing device may not send the target screenshot to the first computing device, but only send the target screenshot to the third computing device.

Moreover, the second computing device further includes: a screen, a power supply component, an audio component, and the like.

Correspondingly, the embodiment of the present invention further provides a computer readable storage medium storing a computer program, which when executed, can implement the steps or operations that can be performed by the second computing device in the above exemplary embodiment.

The memory of FIGS. 7a to 11 above may be implemented by any type of volatile or non-volatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, disk or optical disk.

The communication components of FIGS. 7a to 11 above may be configured to facilitate wired or wireless communication between the device in which the communication component is located and other devices. The device in which the communication component is located can access a wireless network based on a communication standard such as Wi-Fi, 2G or 3G, or a combination thereof. In an exemplary embodiment, the communication component receives a broadcast signal or broadcast associated information from an external broadcast management system via a broadcast channel. In another exemplary embodiment, the communication component further includes a near field communication (NFC) module to facilitate short range communication. For example, the NFC module can be implemented based on radio frequency identification (RFID) technology, infrared data association (IrDA) technology, ultra-wideband (UWB) technology, Bluetooth (BT) technology, and other technologies.

The screens in FIGS. 7a to 11 described above may include a liquid crystal display (LCD) and a touch panel (TP). If the screen includes a touch panel, the screen can be implemented as a touch screen to receive input signals from a user. The touch panel includes one or more touch sensors to sense touches, slides, and various gestures on the touch panel. The touch sensor may sense not only the boundary of the touch or sliding action, but also the duration and pressure associated with the touch or slide operation.

The power supply components of FIGS. 7a to 11 above provide power to the various components of the device in which the power supply components are located. The power supply components can include a power management system, one or more power sources, and other components associated with generating, managing, and distributing power for the devices in which the power components are located.

The audio components of FIGS. 7a to 11 above may be configured to output and/or input audio signals. For example, the audio component includes a microphone (MIC), the microphone is configured to receive an external audio signal when the device in which the audio component is located is in an operational mode, such as a call mode, a recording mode, and a voice recognition mode. The received audio signal can be further stored in a memory or transmitted via a communication component. In some embodiments, the audio component further includes a speaker for outputting an audio signal.

A person skilled in the art will appreciate that embodiments of the present invention can be provided as a method, system, or a computer program product. Accordingly, the present invention may take the form of an entirely hardware embodiment, an entirely software embodiment, or a combination of software and hardware. Moreover, the present invention can take the form of a computer program product embodied on one or more computer-usable storage media (including but not limited to disk storage, CD-ROM, optical storage, etc.) including computer usable program code.

The present invention has been described with reference to flowchart illustrations and/or block diagrams of methods, devices (systems), and computer program products according to embodiments of the invention. It will be understood that the computer program instructions are used to implement each flow and/or block in the flowchart and/or block diagram and a combination of the flows and/or blocks in the flowcharts and/or block diagrams. These computer program instructions can be provided to a processor of a general purpose computer, special purpose computer, embedded processor, or other programmable data processing device to produce a machine, such that the instructions executed by a processor of a computer or other programmable data processing device cause a device for implementing the functions specified in one or more steps in a flow chart and/or in one or more blocks of a block diagram.

The computer program instructions can also be stored in a computer readable memory that can direct a computer or other programmable data processing device to operate in a particular manner, such that the instructions stored in the computer readable memory produce an article of manufacture comprising the instruction device. The instruction device can achieve the functions specified in one or more steps in a flow chart and/or in one or more blocks of a block diagram.

These computer program instructions can also be loaded onto a computer or other programmable data processing device such that a series of operational steps are performed on a computer or another programmable device to produce computer-implemented processing for execution on a computer or another programmable device. The instructions provide steps for implementing the functions specified in one or more steps in a flow chart and/or in one or more blocks of a block diagram.

In a typical configuration, a computing device includes one or more processors (CPUs), an input/output interface, a network interface, and a memory.

The memory may include non-persistent memory, random access memory (RAM), and/or non-volatile memory in a computer readable medium such as read only memory (ROM) or flash memory. Memory is an example of a computer readable medium.

Computer readable media includes both permanent and non-permanent, removable and non-removable media. Information storage can be implemented by any method or technology. The information can be computer readable instructions, data structures, modules of programs, or other types of data. Examples of computer storage media include, but are not limited to, phase change memory (PRAM), static random access memory (SRAM), dynamic random access memory (DRAM), other types of random access memory (RAM), read only memory (ROM), electrically erasable programmable read only memory (EEPROM), flash memory or other memory technology, compact disk read only memory (CD-ROM), digital versatile disk (DVD) or other optical storage, magnetic cassette tape, magnetic tape storage or other magnetic storage device or any other non-transportable media for storing information that can be accessed by a computing device. As defined herein, computer readable media does not include transitory storage computer readable media, such as modulated data signals and carrier waves.

It is also to be understood that the terms "comprises" or "including" or any other variations are intended to encompass a non-exclusive inclusion, such that a process, method, article, and other elements not explicitly listed, or elements that are inherent to such a process, method, commodity, or equipment. An element defined by the phrase "comprising a . . . " does not exclude the presence of additional equivalent elements in the process, method, item, or device including the element.

The above description is only descriptions of some embodiments of the present invention and is not intended to limit the present invention. Various changes and modifications can be made to the present invention by a person skilled in the art. Any modifications, equivalents, improvements, etc. are included within the scope of the claims of the present application.

What is claimed:

1. An information transmission method comprising:
a second terminal receiving a screenshot instruction and a local photo of a screen of the second terminal indicating target area indication information sent by a first terminal, wherein the target area indication information indicates an area position of target information on the screen of the second terminal, wherein the local photo of the screen is obtained by taking a photo of screen area where the target information is located on the screen of the second terminal;
performing a global screenshot of the screen of the second terminal according to the screenshot instruction to obtain an original screenshot;
performing a correlation calculation of the original screenshot and the local photo of the screen to obtain a target screenshot, wherein the performing a global screenshot of the screen of the second terminal according to the screenshot instruction comprises cropping the original screenshot according to the target area indication information to obtain the target screenshot, wherein the cropping the original screenshot according to the target area indication information to obtain the target screenshot comprises:
performing the correlation calculation of the local photo of the screen and the original screenshot to determine a cropping position of the original screenshot; and
cropping the original screenshot based on the cropping position of the original screenshot to obtain the target screenshot; and
sending the target screenshot to the first terminal, wherein the target screenshot is a local screenshot comprising the target information.

2. The method of claim 1, wherein:
a dot pattern is displayed on the screen of the second terminal, the dot pattern comprising a position attribute, and
the cropping of the original screenshot according to the target area indication information to obtain the target screenshot comprises:
determining a cropping position of the original screenshot according to a position attribute of a local dot pattern included in the local photo of the screen and a position attribute of a dot pattern included in the original screenshot; and
wherein the local dot pattern is a partial dot pattern displayed on the screen area where the target information is located.

3. The method of claim 2, wherein the position attribute of the dot pattern comprises at least one of position coordinates, color, and texture of each block in the dot pattern.

4. The method of claim 1, wherein:
a dot pattern is displayed on the screen of the second terminal, the dot pattern comprising a position attribute, and
the receiving of the target area indication information sent by a first terminal comprises:
receiving a position attribute of a local dot pattern sent by the first terminal, wherein the local dot pattern is a partial dot pattern displayed on the screen area where the target information is located.

5. The method of claim 4, wherein cropping of the original screenshot according to the target area indication information to obtain the target screenshot comprises:
determining a cropping position of the original screenshot according to a location attribute of the local dot pattern and a location attribute of the dot pattern included in the original screenshot; and
cropping the original screenshot according to the cropping position to obtain the target screenshot.

6. The method of claim 1, wherein performing of a global screenshot on the screen of the second terminal according to the screenshot instruction to obtain the original screenshot comprises:
performing a global screenshot on the screen of the second terminal to obtain a plurality of screenshot frames based on the screenshot instruction according to a set screenshot frequency; and
selecting at least one screenshot frame having a screenshot time that matches an acquisition time of the target area indication information from the plurality of screenshot frames to be the original screenshot.

7. An information transmission method comprising:
sending, by a first terminal, a screenshot instruction and a local photo of a screen of the second terminal indicating target area indication information to a second terminal, wherein the target area indication information is used to indicate an area position of target information on the screen of the second terminal, wherein the local photo comprises a partial dot pattern displayed on the screen area where the target information is located, wherein the sending of the target area indication information to the second terminal comprises taking a photo of the screen area where the target information is located on the screen of the second terminal to obtain a local photo of the screen, wherein a dot pattern is displayed on the screen of the second terminal, the dot pattern comprises a position attribute, and the local photo of the screen comprises a local dot pattern, and the local dot pattern is the partial dot pattern displayed on the screen area where the target information is located; and receiving a target screenshot sent by the second terminal, wherein the target screenshot is a local screenshot comprising the target information obtained by means of the second terminal performing a screenshot on the screen of the second terminal according to the screenshot instruction and the target area indication information.

8. The method of claim 7, wherein the sending of the target area indication information to the second terminal comprises
identifying the position attribute of a local dot pattern included in the local photo of the screen, and transmitting the position attribute of the local dot pattern to the second terminal.

9. An information transmission method comprising:

taking, by a first terminal, a photo of a screen area where target information is located on a screen of a second terminal, to obtain a local photo of the screen;

sending a screenshot instruction to the second terminal to instruct the second terminal to perform a global screenshot of the screen thereof;

receiving an original screenshot returned by the second terminal; and cropping the original screenshot according to the local photo of the screen to obtain a target screenshot based on a correlation calculation with the local photo of the screen and the original screenshot, wherein the target screenshot is a local screenshot containing the target information, wherein the cropping the original screenshot according to the local photo of the screen to obtain the target screenshot comprises:
performing the correlation calculation with the local photo of the screen and the original screenshot to determine a cropping position of the original screenshot; and
cropping the original screenshot is based on the cropping position of the original screenshot to obtain the target screenshot.

10. The method of claim 9, wherein:

a dot pattern is displayed on the screen of the second terminal, the dot pattern comprises a position attribute.

11. An information transmission method comprising:

receiving a screenshot instruction sent by a first terminal and forwarding the screenshot instruction to a second terminal, so that the second terminal performs a global screenshot on the screen thereof to obtain an original screenshot;

receiving the original screenshot sent by the second terminal and a local photo of a screen of the second terminal indicating target area indication information sent by the first terminal, wherein the target area indication information indicates an area position of the target information on the screen of the second terminal, wherein the local photo of the screen is a photo obtained by means of the first terminal taking a photo of the screen area where the target information is located on the screen of the second terminal;

cropping the original screenshot according to the target area indication information to obtain a target screenshot based on a correlation calculation with the local photo of the screen and the original screenshot, wherein the cropping the original screenshot according to the target area indication information to obtain the target screenshot comprises:
performing the correlation calculation with the local photo of the screen and the original screenshot to determine a cropping position of the original screenshot; and
cropping the original screenshot is based on the cropping position of the original screenshot to obtain the target screenshot; and sending the target screenshot to the first terminal, wherein the target screenshot is a local screenshot comprising the target information.

12. The method of claim 11, wherein:

a dot pattern is displayed on the screen of the second terminal and the dot pattern comprises a position attribute;

cropping of the original screenshot according to the target area indication information to obtain the target screenshot comprises determining a cropping position of the original screenshot according to a position attribute of a local dot pattern included in the local photo of the screen and a position attribute of a dot pattern included in the original screenshot; and cropping the original screenshot is based on cropping position of the original screenshot to obtain the target screenshot.

\* \* \* \* \*